(12) United States Patent
Oyama

(10) Patent No.: US 10,554,834 B2
(45) Date of Patent: Feb. 4, 2020

(54) IMAGE READING APPARATUS INCLUDING MOVABLE PLATE AND DISCHARGE UNIT

(71) Applicant: BROTHER KOGYO KABUSHIKI KAISHA, Aichi-ken (JP)

(72) Inventor: Yoshihiro Oyama, Aichi (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 16/262,876

(22) Filed: Jan. 30, 2019

(65) Prior Publication Data

US 2019/0238699 A1 Aug. 1, 2019

(30) Foreign Application Priority Data

Jan. 31, 2018 (JP) .................................. 2018-014387

(51) Int. Cl.
*H04N 1/00* (2006.01)

(52) U.S. Cl.
CPC ..... *H04N 1/00604* (2013.01); *H04N 1/00591* (2013.01); *H04N 1/00615* (2013.01); *H04N 1/00798* (2013.01)

(58) Field of Classification Search
None
See application file for complete search history.

(56) References Cited

U.S. PATENT DOCUMENTS

2015/0288837 A1* 10/2015 Morikawa .......... H04N 1/00729
358/474

FOREIGN PATENT DOCUMENTS

| JP | 10-167545 A | 6/1998 |
| JP | 2005-8283 A | 1/2005 |

* cited by examiner

*Primary Examiner* — Lennin R Rodriguezgonzalez
(74) *Attorney, Agent, or Firm* — Kenealy Vaidya LLP

(57) ABSTRACT

An image reading apparatus includes: a supply tray; a discharge tray, which is positioned below the supply tray to support the sheet; a conveyance guide, which conveys the sheet from the supply tray to the discharge tray; a reading sensor, which reads an image on the sheet conveyed on the conveyance guide; a discharge unit, which includes a discharge port to discharge the sheet conveyed by the conveyance guide to the discharge tray and is configured to move from a third position to a fourth position, the fourth position being higher than the third position; a first drive source, which generates a drive force; and a second drive source, which generates a drive force, wherein the movable plate is moved by the drive force from the first drive source, and the discharge unit is moved by the drive force from the second drive source.

8 Claims, 13 Drawing Sheets

IMAGE READING APPARATUS INCLUDING MOVABLE PLATE AND DISCHARGE UNIT

CROSS-REFERENCE TO RELATED APPLICATION

This application claims priority from Japanese Patent Application No. 2018-014387 filed on Jan. 31, 2018, the entire subject matter of which is incorporated herein by reference.

TECHNICAL FIELD

This disclosure relates to an image reading apparatus.

BACKGROUND

The background art discloses a document feeding device being an example of image reading apparatuses according to the background art. The document feeding device is provided with a paper feed tray, a paper discharge tray and a conveyance guide. The paper feed tray supports a supplied document. The paper discharge tray is positioned below the paper feed tray and supports the document to be discharged. The conveyance guide conveys the document from the paper feed tray to the paper discharge tray. In the middle of the conveyance guide, an image reading position for reading an image on the document to be conveyed on the conveyance guide is set.

The paper feed tray moves upward as sheets supported by the paper feed tray is decreased and approaches a document pickup unit. The document feeding device further includes a swing conveyance unit. The swing conveyance unit includes a discharge port to discharge the document conveyed by the conveyance guide to the paper discharge tray. The swing conveyance unit moves upward as the document supported by the paper feed tray is decreased, thereby separating the discharge port from the paper discharge tray. Specifically, a link member is installed between the paper feed tray and the swing conveyance unit, and the discharge port of the swing conveyance unit ascends and descends by the same amount according to the ascent and descent of the paper feed tray. In this case, the paper feed tray and the swing conveyance unit are driven by one driving motor configuring an ascent and descent mechanism. In this manner, the document feeding device is designed to achieve miniaturization in the up and down direction.

SUMMARY

Meanwhile, an image reading apparatus including the same configuration as that of the document feeding device described hereinabove is assumed. The image reading apparatus is provided with a supply tray including a movable body and a discharge unit. The discharge unit includes a discharge port to discharge a sheet to a discharge tray. A link member is installed between a movable plate of the supply tray and the discharge unit. Further, the discharge port of the discharge unit ascends and descends by the same amount according to the ascent and descent of the movable plate of the supply tray.

However, in the image reading apparatus, there is a problem that it is difficult to design a moving amount of the movable plate and a moving amount of the discharge unit according to respectively required specifications.

This disclosure is to provide an image reading apparatus capable of designing the moving amount of the movable plate and the moving amount of the discharge unit according to the respectively required specifications.

An image reading apparatus of this disclosure includes: a supply tray, which supports sheets to be supplied and includes a movable plate configured to move from a first position to a second position as the sheet supported by the paper feed tray is decreased, the second position being higher than the first position; a discharge tray, which is positioned below the supply tray to support the sheet to be discharged; a conveyance guide, which conveys the sheet from the supply tray to the discharge tray; a reading sensor, which reads an image on the sheet conveyed on the conveyance guide; a discharge unit, which includes a discharge port to discharge the sheet conveyed by the conveyance guide to the discharge tray and is configured to move from a third position to a fourth position as the sheet supported by the paper feed tray is decreased, the fourth position being higher than the third position; a first drive source, which generates a drive force; and a second drive source, which generates a drive force. The movable plate is moved by the drive force from the first drive source, and the discharge unit is moved by the drive force from the second drive source.

In the image reading apparatus of this disclosure, a drive system of the movable plate and a drive system of the discharge unit are separated from each other. Therefore, the influence of the discharge unit is hardly received when the moving amount of the movable plate is designed. Further, an influence of the movable plate is hardly received when the moving amount of the discharge unit is designed.

Accordingly, in the image reading apparatus of this disclosure, it is possible to design the moving amount of the movable plate and the moving amount of the discharge unit according to the respectively required specifications.

BRIEF DESCRIPTION OF THE DRAWINGS

The foregoing and additional features and characteristics of this disclosure will become more apparent from the following detailed descriptions considered with the reference to the accompanying drawings, wherein:

FIG. 5 is a partial cross-sectional view illustrating the image reading apparatus according to the first embodiment and is a diagram illustrating a first drive source, a first drive train and the like;

FIG. 6 is a partial cross-sectional view illustrating the image reading apparatus according to the first embodiment and is a diagram illustrating the first drive source, the first drive train and the like;

FIG. 11 is a partial cross-sectional view illustrating an image reading apparatus according to a second embodiment and is a diagram illustrating a first drive source, a second drive train and the like;

DETAILED DESCRIPTION

Hereinafter, first and second embodiments in which this disclosure is embodied will be described with reference to the drawings.

First Embodiment

Figure 1:
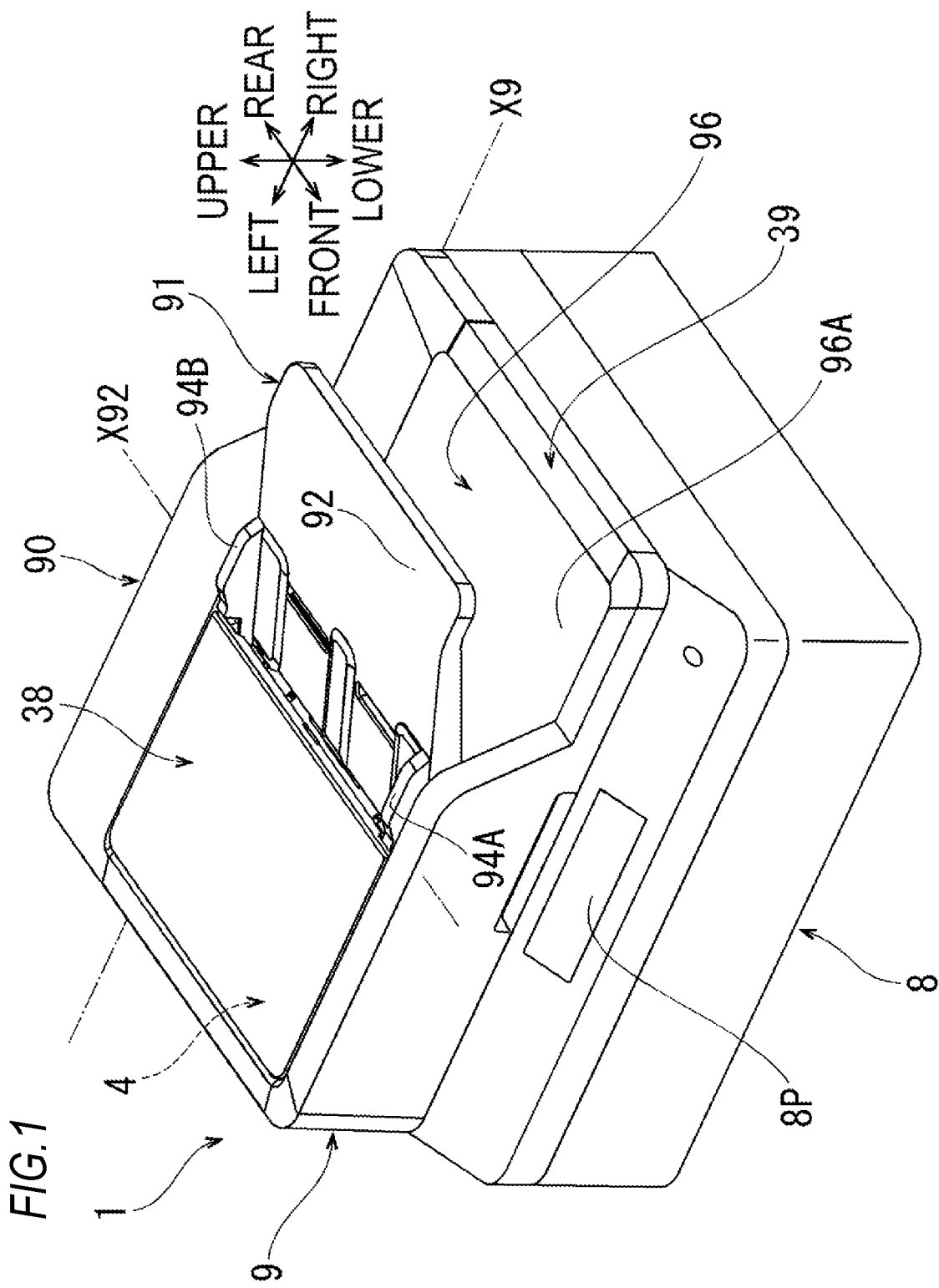
FIG. 1 is a perspective view illustrating an image reading apparatus according to a first embodiment.
Figure 2:
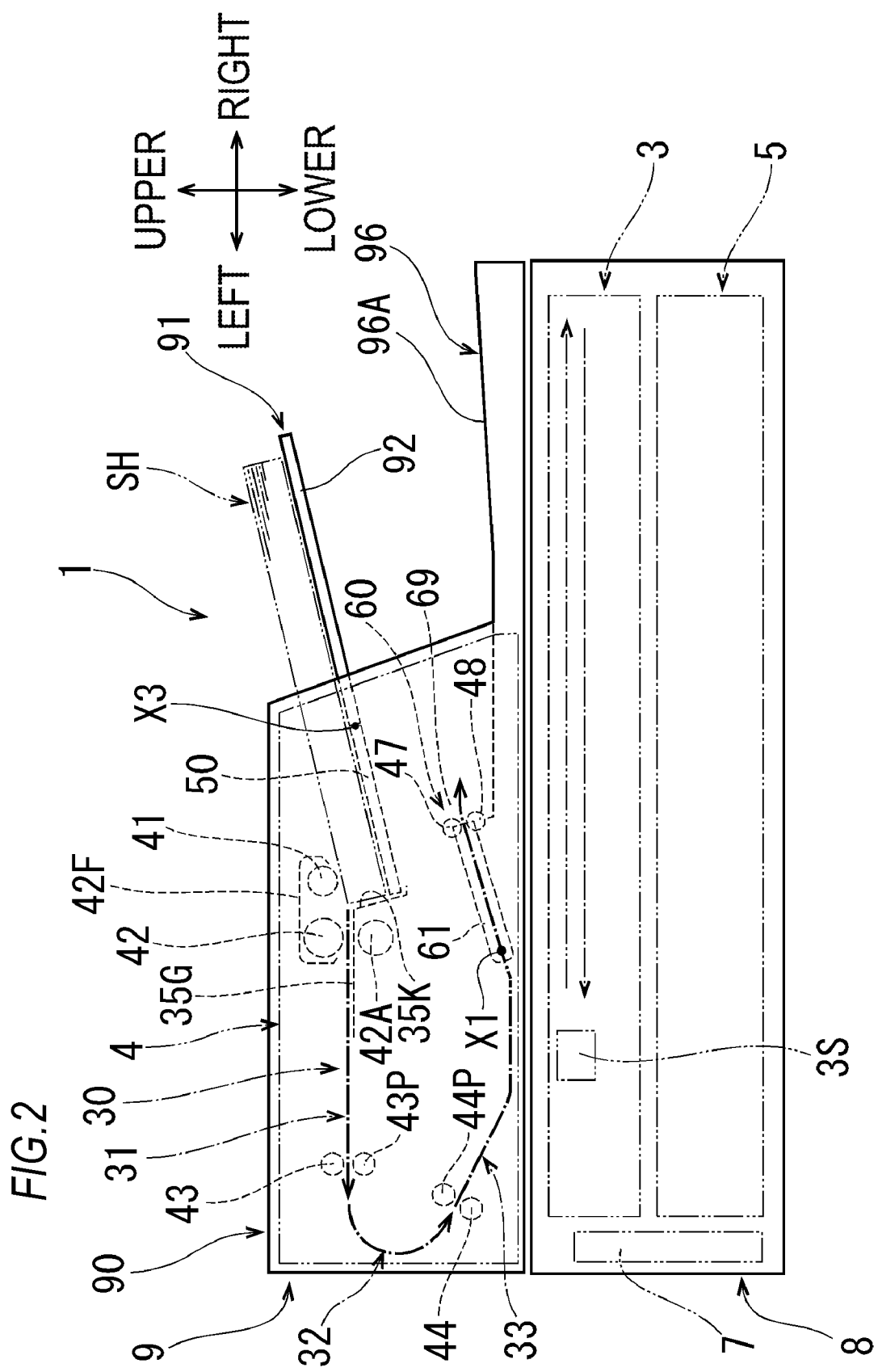
FIG. 2 is a schematic front view illustrating the image reading apparatus according to the first embodiment.

As illustrated in FIG. 1, an image reading apparatus 1 of a first embodiment is an example of a specific aspect of the image reading apparatus of this disclosure. In FIG. 1, a side on which an operation panel 8P is disposed is defined as a front side of a device, and a side which comes to the left when facing the operation panel 8P is defined as a left side, thereby displaying respective directions of front, rear, left, right, upper and lower sides. Then, each direction illustrated in each drawing from FIG. 2 is displayed corresponding to each direction illustrated in FIG. 1. Hereinafter, respective components provided in the image reading apparatus 1 will be described based on FIG. 1 and the like.

<Overall Configuration>

As illustrated in FIGS. 1 to 4, the image reading apparatus 1 includes a main body unit 8, an opening and closing unit 9, an image forming unit 5, a reading unit 3, an automatic conveyance mechanism 4 and a controller 7. The main body unit 8 is an approximately flat box-shaped body. As illustrated in FIG. 1, the operation panel 8P, which is a touch panel and the like, is provided on a front surface of the main body unit 8.

Figure 5:
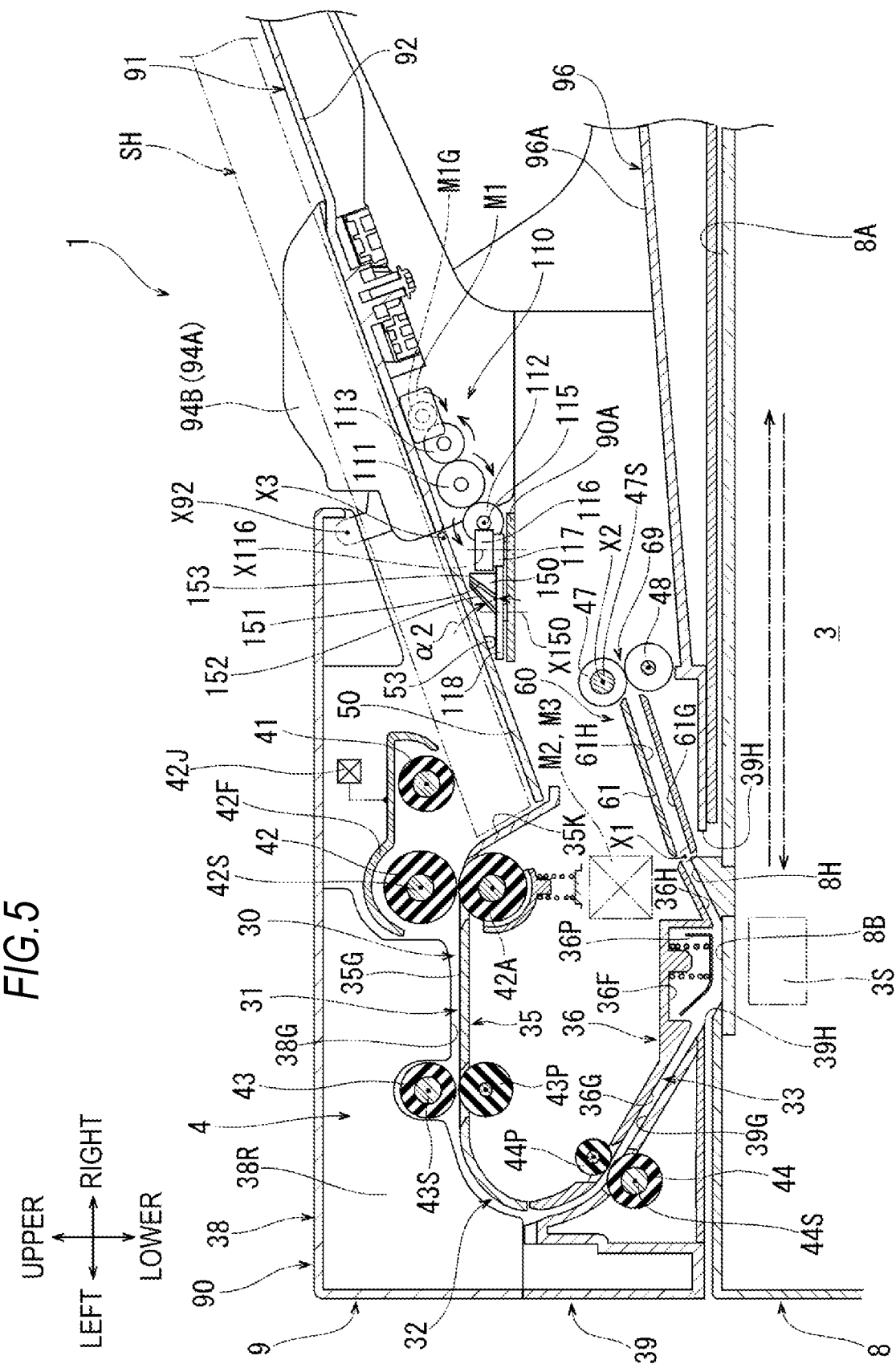

As illustrated in FIG. 2, the image forming unit 5 is stored at a lower portion in the main body unit 8. The image forming unit 5 forms an image on a sheet by an ink jet method, a laser method, or the like. As illustrated in FIGS. 2 and 5, the reading unit 3 is positioned at an upper portion in the main body unit 8. The reading unit 3 is used when reading an image on a document. The automatic conveyance mechanism 4 is provided in the opening and closing unit 9. The automatic conveyance mechanism 4 is used when allowing the reading unit 3 to read an image on a sheet SH while sequentially conveying the sheet SH supported by a supply tray 91 along a conveyance guide 30.

Figure 4:
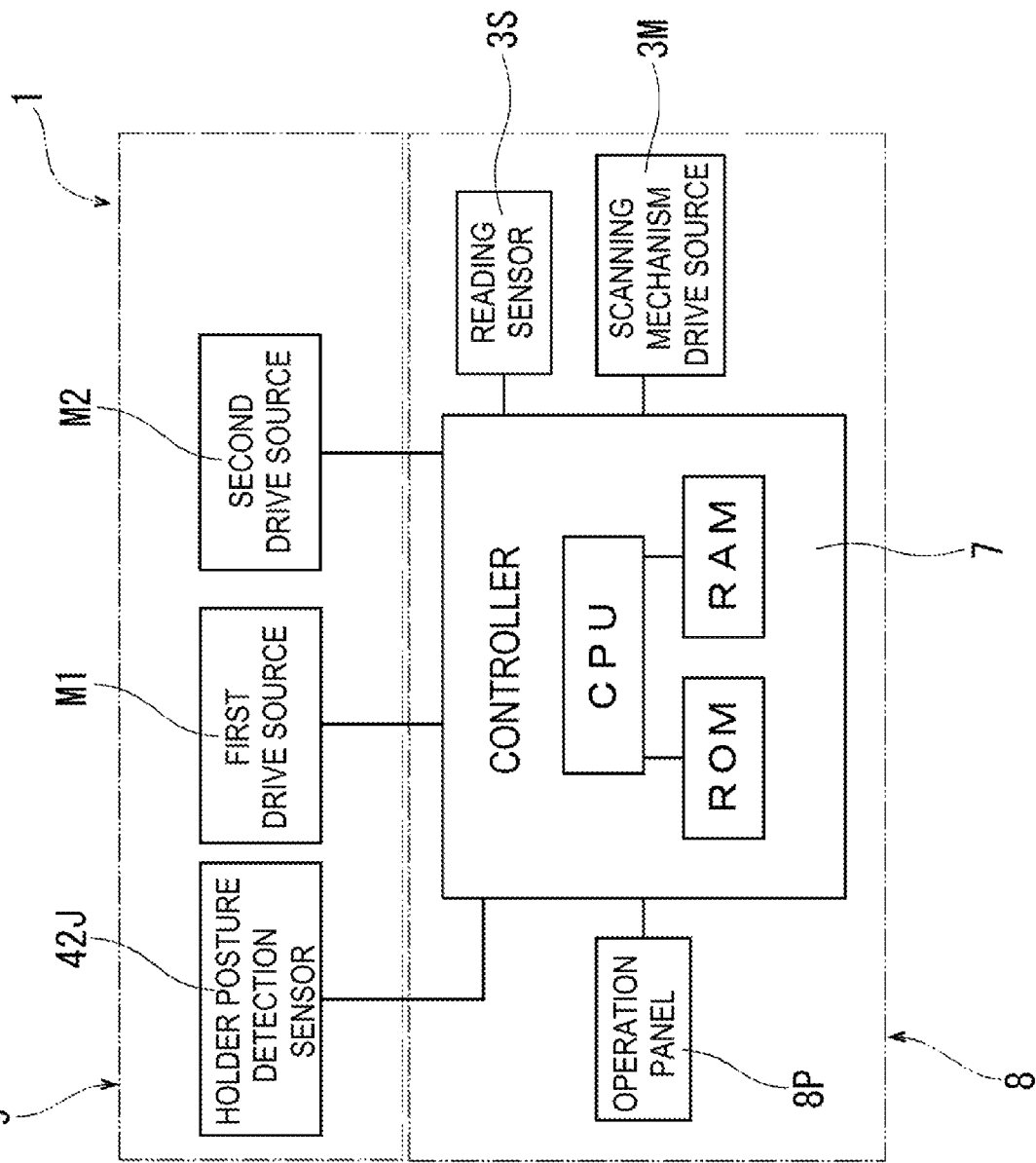
FIG. 4 is a block diagram illustrating the image reading apparatus according to the first embodiment.

As illustrated in FIGS. 2 and 4, the controller 7 is stored at a position along a left side surface in the main body unit 8. The controller 7 is formed as a microcomputer mainly including a CPU, a ROM and a RAM. The ROM stores a program for the CPU to control various operations of the image reading apparatus 1, a program for performing identification processing and the like. The RAM is used as a storage region for temporarily recording data and signals used when the CPU executes the programs, or as a work region for data processing. The controller 7 controls the image forming unit 5, the reading unit 3, the automatic conveyance mechanism 4 and the operation panel 8P.

As illustrated in FIG. 5, platen glass is disposed on an upper surface of the main body unit 8 and a document supporting surface 8A with a large area is formed by an upper surface of the platen glass. Further, another platen glass is disposed on a left side further than the document supporting surface 8A on the upper surface of the main body unit 8, and an elongated reading surface 8B is formed in a front and rear direction by an upper surface of the another platen glass.

The document supporting surface 8A supports the document from below when the reading unit 3 reads an image on the document in a stationary state. The document which is an object to be read includes a sheet such as a paper, or an OHP sheet as well as a book and the like.

The reading surface 8B contacts the conveyed sheet SH from below when the reading unit 3 reads the image on the sheet SH conveyed one by one by the automatic conveyance mechanism 4. A guide protruding unit 8H is provided between the document supporting surface 8A and the reading surface 8B on the upper surface of the main body unit 8. The guide protruding unit 8H scoops up the sheet SH to be conveyed while contacting the reading surface 8B and guides the sheet SH so as to be inclined upward to the right.

Further, in the embodiment, an object whose image is read by using the document supporting surface 8A is described as a document, and an object whose image is read while being conveyed by the automatic conveyance mechanism 4 is described as a sheet. The document and the sheet may be substantially the same.

As illustrated in FIG. 1, the opening and closing unit 9 is supported to be able to oscillate around an opening and closing axis X9 extending in the left and right direction by a hinge, which is not illustrated and disposed at a rear end part of the main body unit 8. The opening and closing unit 9 covers the document supporting surface 8A and the reading surface 8B from above in a closed state illustrated in FIGS. 1 and 5 and the like. Although illustration is omitted, the opening and closing unit 9 is displaced to an open position where the document supporting surface 8A and the reading surface 8B are exposed by oscillating around the opening and closing axis X9 so that the front end part thereof is displaced upward and rearward. Accordingly, a user can support the document which is an object to be read on the document supporting surface 8A.

Further, when describing a configuration, an internal structure and the like of the opening and closing unit 9, a posture of the opening and closing unit 9 in a closed state is set as a reference in the up and down direction and the front and rear direction.

The reading unit 3 includes a reading sensor 3S stored at an upper portion in the main body unit 8 as illustrated in FIGS. 2 to 6, a scanning mechanism drive source 3M illustrated in FIG. 4 and a scanning mechanism, which is not illustrated, driven by the scanning mechanism drive source. As the reading sensor 3S, a well-known image reading sensor such as a contact image sensor (CIS), a charge coupled device (CCD) and the like is used.

As illustrated in FIG. 5, the reading sensor 3S is positioned below the document supporting surface 8A and the reading surface 8B. The scanning mechanism, which is not illustrated, is driven by the scanning mechanism drive source 3M when reading the image on the document supported by the document supporting surface 8A, and the reading sensor 3S is reciprocated in the left and right direction below the document supporting surface 8A in the main body unit 8. Further, the scanning mechanism, which is not illustrated, is driven by the scanning mechanism drive source 3M when the reading sensor 3S reads the image on the sheet SH conveyed by the automatic conveyance mechanism 4, and the reading sensor 3S is stopped under the reading surface 8B in the main body unit 8. A position where the reading sensor 3S is stopped under the reading surface 8B is a predetermined stationary reading position.

As illustrated in FIG. 1, the opening and closing unit 9 includes a housing 90. The housing 90 is a housing including a base member 39, a first chute member 35, a second chute member 36 and a cover member 38 as shown in FIGS. 5 and 6, and also including a inner frame such as a first side frame 9A and a second side frame 9B as shown in FIG. 7.

Figure 6:
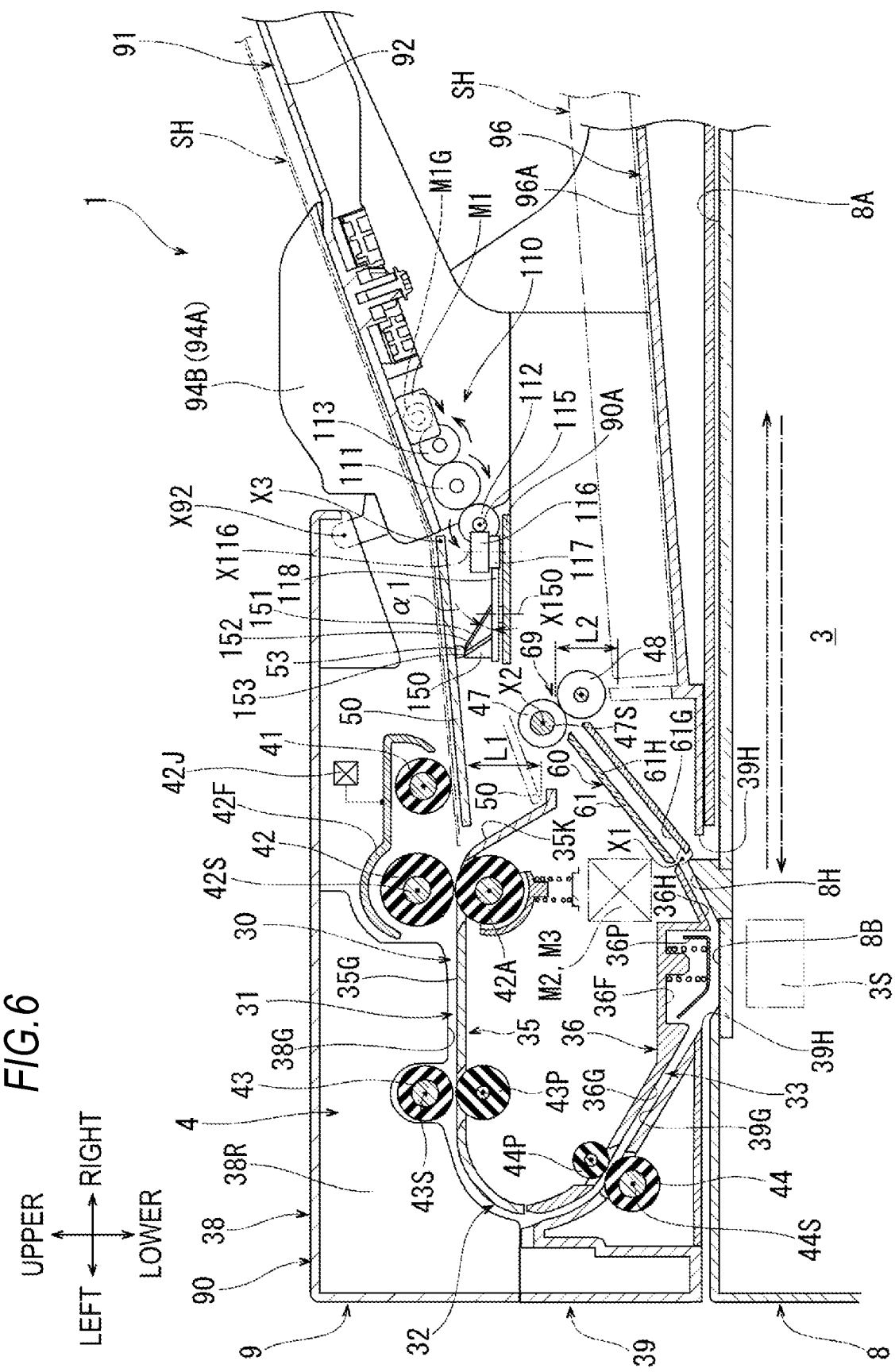
Figure 7:
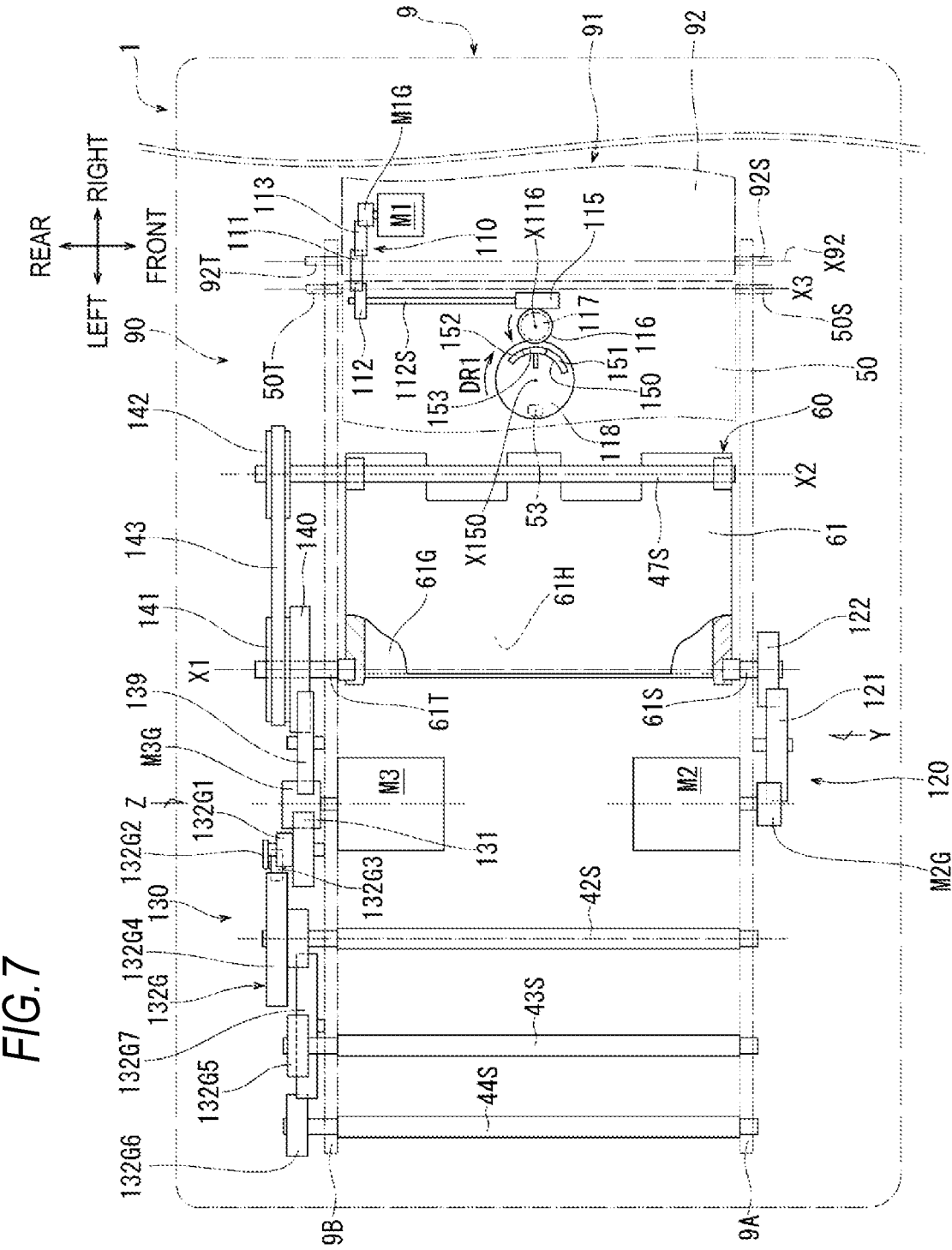
FIG. 7 is a schematic top view illustrating the image reading apparatus according to the first embodiment.

As shown in FIGS. 5 and 6, the base member 39 forms a bottom wall of the opening and closing unit 9. In the base member 39, a rectangular hole 39H in which a region opposite to the reading surface 8B and the guide protruding unit 8H is cut out in an approximately rectangular shape is formed. A conveyance surface 39G is formed at a portion positioned on the left side further than the rectangular hole 39H in the base member 39. A left end part of the conveyance surface 39G is curved to be inclined downward to the right by changing a direction from a downward direction. The conveyance surface 39G is inclined downward up to a left end edge of the rectangular hole 39H.

The second chute member 36 is disposed above a left portion of the base member 39. A pressing member holding part 36F and guide surfaces 36G and 36H are formed in the second chute member 36. The pressing member holding part 36F is a recessed portion which is recessed upward at a position opposite to the reading surface 8B. In the pressing member holding unit 36F, a pressing member 36P is held to be able to be displaced in the up and down direction. The pressing member 36P presses the sheet SH conveyed while contacting the reading surface 8B from above, thereby preventing the sheet SH from floating from the reading surface 8B. The guide surface 36G is positioned on the left side further than the pressing member holding part 36F. A left end part of the guide surface 36G is curved along the left end part of the conveyance surface 39G of the base member 39. The guide surface 36G is inclined downward to the right along a portion inclined downward of the conveyance surface 39G of the base member 39. The guide surface 36H is positioned on the right side further than the pressing member holding part 36F. The guide surface 36H is inclined upward to the right along the guide protruding unit 8H of the main body unit 8.

The first chute member 35 is disposed above the second chute member 36. A regulation surface 35K and a conveyance surface 35G are formed in the first chute member 35. The regulation surface 35K is inclined upward to the left from a right end part of the first chute member 35. The conveyance surface 35G is connected to an upper end of the regulation surface 35K and extends approximately horizontally to the left. A left end part of the conveyance surface 35G is curved so as to change a direction thereof from the left direction to the downward direction.

The cover member 38 is disposed above the first chute member 35. A guide surface 38G which is formed by lower end edges of a plurality of ribs 38R protruding downward is formed in the cover member 38. A right end part of the guide surface 38G is opposite to the conveyance surface 35G from above at a position deviated to the left side further than a connection unit between the regulation surface 35K and the conveyance surface 35G in the first chute member 35. The guide surface 38G extends approximately horizontally to the left along the conveyance surface 35G of the first chute member 35. A left end part of the guide surface 38G is curved along the left end part of the conveyance surface 35G of the first chute member 35.

Figure 8:
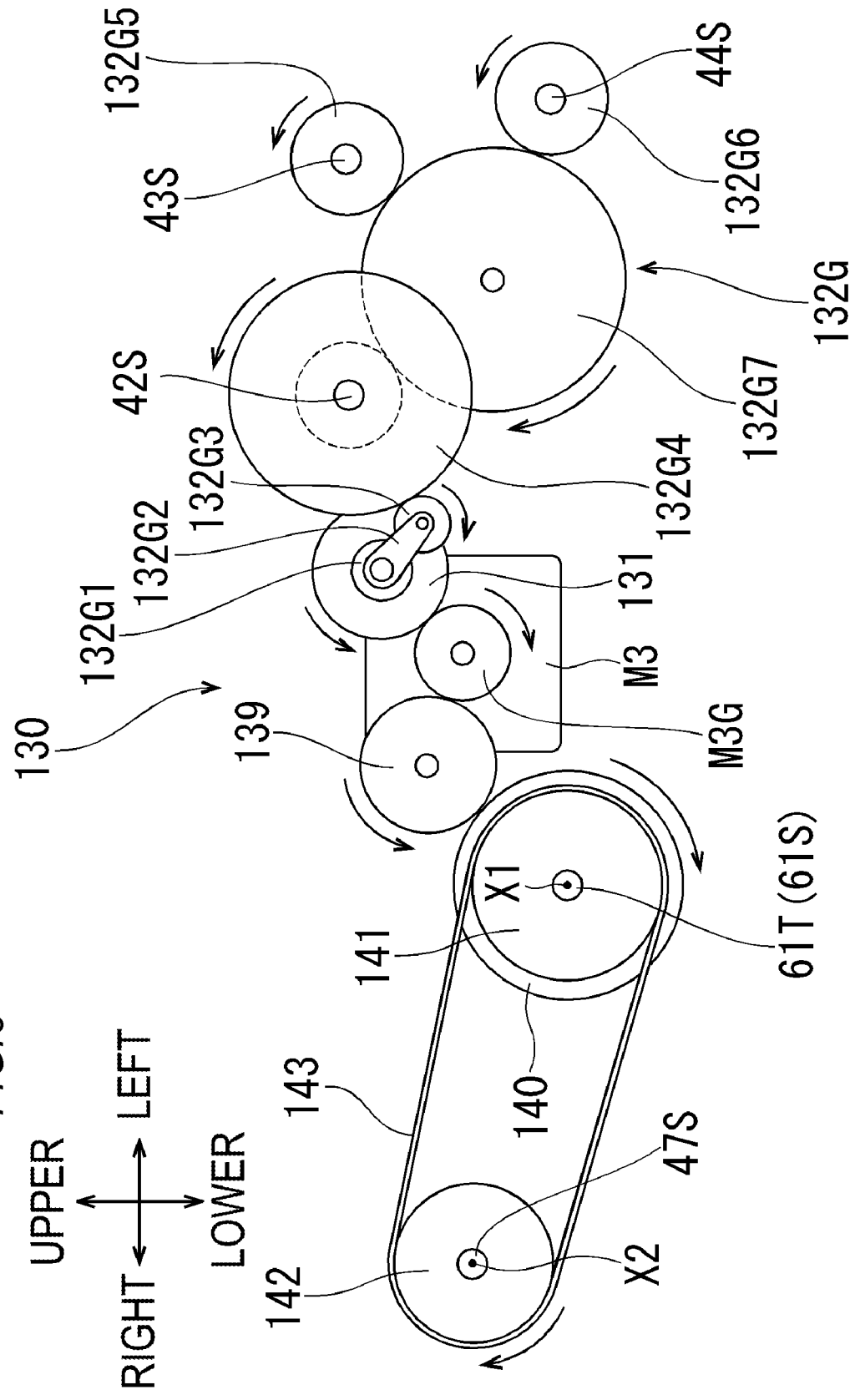
FIG. 8 is a schematic diagram illustrating a conveyance drive source, a conveyance drive train and the like as viewed from an arrow Z direction in FIG. 7.

As illustrated in FIG. 7, the first side frame 9A is disposed to extend in the left and right direction on a front surface side of the opening and closing unit 9 and forms a part of an internal frame of the housing 90. The second side frame 9B is disposed to extend in the left and right direction on a rear surface side of the opening and closing unit 9 and forms a part of the internal frame of the housing 90. The first side frame 9A and the second side frame 9B are opposite to each other in the front and rear direction so that the guide surface 38G of the cover member 38, the regulation surface 35K and the conveyance surface 35G of the first chute member 35, the guide surfaces 36G and 36H of the second chute member 36 and the conveyance surface 39G of the base member 39, all of which are illustrated in FIG. 5 and the like, are sandwiched therebetween. Further, in FIG. 7, a part of a supply tray main body 92 of the supply tray 91 and a part of a movable plate 50 are illustrated in a simplified manner for ease of description. Additionally, FIG. 7 illustrates that positions of a second drive source M2 and a conveyance drive source M3 deviate to the right side from a position lower than a rotation shaft 42S of a separation roller 42 for ease of description. Also, FIG. 8 illustrates that the position of the conveyance drive source M3 deviates to the right side from the position lower than the rotation shaft 42S of the separation roller 42.

As illustrated in FIGS. 2, 3, 5, and 6, the opening and closing unit 9 includes the conveyance guide 30 forming a unit of the automatic conveyance mechanism 4, the supply tray 91 for supporting the sheet SH supplied to the conveyance guide 30 and a discharge tray 96 for supporting the sheet SH discharged from the conveyance guide 30.

As illustrated in FIG. 5, the supply tray 91 is positioned on the right side further than the first chute member 35 and is disposed above a right portion of the base member 39. The supply tray 91 includes the supply tray main body 92 and the movable plate 50. The supply tray main body 92 is gently inclined downward from a right end part side of the opening and closing unit 9 to the left. The movable plate 50 is disposed to be adjacent to a left end part of the supply tray main body 92. The movable plate 50 extends in an approximately flat plate shape toward the regulation surface 35K of the first chute member 35.

The movable plate 50 is covered with a right portion of the cover member 38 from above. The supply tray 91 supports the sheet SH supplied to the automatic conveyance mechanism 4 by the supply tray main body 92 and the movable plate 50.

As illustrated in FIG. 7, the movable plate 50 includes shaft units 50S and 50T having a third axis X3 extending in the front and rear direction as an axis. A front shaft unit 50S is a cylindrical shaft protruding forward from a front and right corner part of the movable plate 50. The front shaft unit 50S is rotatably supported by the first side frame 9A. A rear shaft unit 50T is a cylindrical shaft protruding rearward from a rear and right corner part of the movable plate 50. The rear shaft unit 50T is rotatably supported by the second side frame 9B. Accordingly, the movable plate 50 is supported by the housing 90 to be rotatable around the third axis X3.

Figure 3:
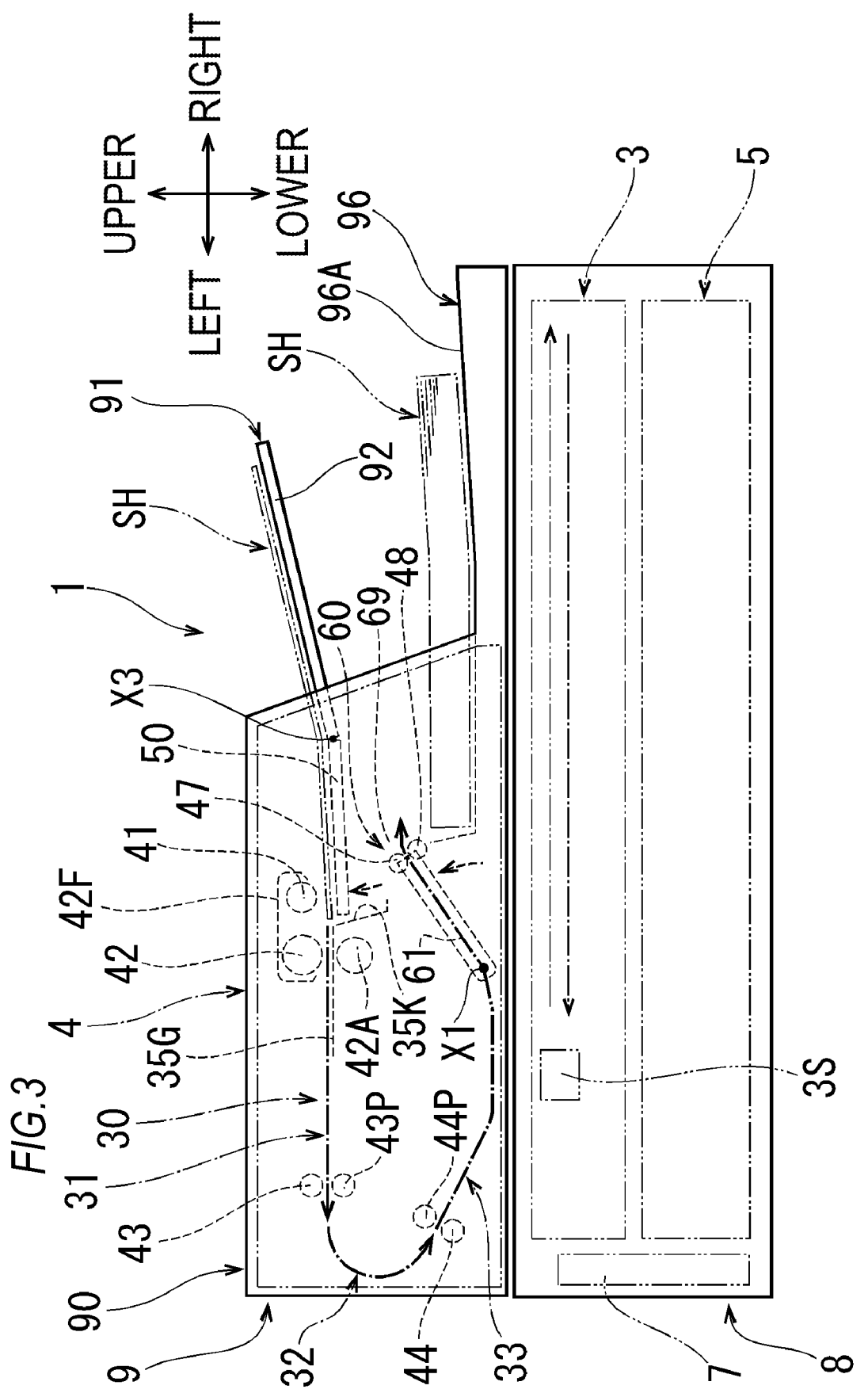
FIG. 3 is a schematic front view illustrating the image reading apparatus according to the first embodiment.

As will be described later in detail, the movable plate 50 is configured to rotate from a first position illustrated in FIGS. 2, and 5 to a second position illustrated in FIGS. 3 and 6 by operating the first drive source M1 and a first drive train 110 illustrated in FIGS. 5 to 7 and the like according to the decrease of the sheets SH supported by the supply tray 91. The second position illustrated in FIG. 6 and the like is a position above the first position illustrated in FIG. 5 and the like. In other words, the second position is higher than the first position.

As illustrated in FIGS. 1 and 5, two width regulation guides 94A and 94B are provided on the supply tray main body 92 to be respectively slidable in the front and rear direction. A plurality of types of the sheets SH having a different size supported by the supply tray 91 are sandwiched from the front side and the rear side in such a manner that the front width regulation guide 94A and the rear width regulation guide 94B approach each other or are separated from each other. Accordingly, the sheets SH having various sizes can be determined to be positioned based upon a center part in a width direction of the supply tray 91 as a reference.

As illustrated in FIG. 5, the discharge tray 96 is formed on the right portion of the base member 39. That is, the discharge tray 96 is provided so as to be overlapped with the supply tray 91 at a position lower than the supply tray 91. In the discharge tray 96, the sheet SH of which image is read by the reading sensor 3S and which is conveyed by the automatic conveyance mechanism 4 is discharged. An upper surface of the discharge tray 96 is a sheet supporting surface 96A for supporting the sheet SH to be discharged.

The conveyance guide 30 forms a conveyance path for conveying the sheet SH from the supply tray 91 toward the discharge tray 96. Specifically, the conveyance guide 30 includes a first guide 31, a second guide 32 and a third guide 33.

The first guide 31 is configured to include an approximately horizontally extending portion of the conveyance surface 35G of the first chute member 35 and an approximately horizontally extending portion of the guide surface 38G of the cover member 38. The first guide 31 guides the sheet SH sent out from the supply tray 91 to the left.

The second guide 32 is configured to include a curved left end part of the conveyance surface 35G of the first chute member 35; a curved left end part of the guide surface 38G of the cover member 38; a curved left end part of the conveyance surface 39G of the base member 39; and a curved left end part of the guide surface 36G of the second chute member 36. The second guide 32 is connected to the first guide 31 and changes the conveyance direction of the sheet SH from the left direction to the right direction.

The third guide 33 is configured to include a downwardly inclined portion of the conveyance surface 39G of the base member 39; a downwardly inclined portion of the guide surface 36G of the second chute member 36; and the guide surface 36H of the second chute member 36. The third guide 33 is connected to the second guide 32 and guides the sheet SH toward the discharge tray 96.

The automatic conveyance mechanism 4 includes a discharge unit 60 to discharge the sheet SH guided by the third guide 33 to the discharge tray 96 by a discharge guide 61. The conveyance surface 61G and the guide surface 61H are formed in the discharge guide 61. The conveyance surface 61G is positioned on the right side further than the guide protruding unit 8H of the main body unit 8 and is inclined upward to the right. The guide surface 61H is positioned on the right side further than the guide surface 36H of the second chute member 36. The guide surface 61H is inclined upward to the right along the conveyance surface 61G. The discharge guide 61 includes a discharge port 69 to discharge the sheet SH to the discharge tray 96. The discharge port 69 is opened between a right end part of the conveyance surface 61G and a right end part of the guide surface 61H.

As illustrated in FIG. 7, in the discharge unit 60, the discharge guide 61 is an approximately angular cylindrical member in which a flat plate on which the conveyance surface 61G is formed and a flat plate on which the guide surface 61H is formed are opposite to each other in the up and down direction and a front end edge and a rear end edge of the both flat plates are connected to each other by a pair of front and rear side plates. The discharge guide 61 includes shaft units 61S and 61T in which a first axis X1 extending in the front and rear direction is set as an axis. The first axis X1 is parallel with the third axis X3.

The front shaft unit 61S is a cylindrical shaft protruding forward from a front and left corner part of the conveyance surface 61G and the guide surface 61H. The front shaft unit 61S is rotatably supported by the first side frame 9A and protrudes forward further than the first side frame 9A.

The rear shaft unit 61T is a cylindrical shaft protruding rearward from a rear and left corner part of the conveyance surface 61G and the guide surface 61H. The rear shaft unit 61T is rotatably supported by the second side frame 9B and protrudes rearward further than the second side frame 9B.

Accordingly, the discharge guide 61 is rotatable around the first axis X1. As illustrated in FIG. 5, a position of the first axis X1 is set so as to be overlapped with a conveyance path formed by the third guide 33 of the conveyance guide 30 and the discharge guide 61.

The discharge unit 60 includes a discharge roller 47 and a discharge pinch roller 48. The discharge roller 47 is disposed above the discharge port 69. The discharge pinch roller 48 is disposed below the discharge port 69.

Although not illustrated herein, a plurality of sets of discharge rollers 47 and discharge pinch rollers 48 are disposed with an interval in the front and rear direction.

The discharge roller 47 is fixed to a rotation shaft 47S having the second axis X2 parallel with the first axis X1 as an axis. As illustrated in FIG. 7, a front end part of the rotation shaft 47S is rotatably supported at a front and right corner part of the discharge guide 61. A rear end part side of the rotation shaft 47S is rotatably supported at a rear and right corner part of the discharge guide 61. The rear end part of the rotation shaft 47S protrudes rearward further than the discharge guide 61. Accordingly, the discharge roller 47 is supported by the discharge guide 61 to be rotatable around the second axis X2.

Figure 9:
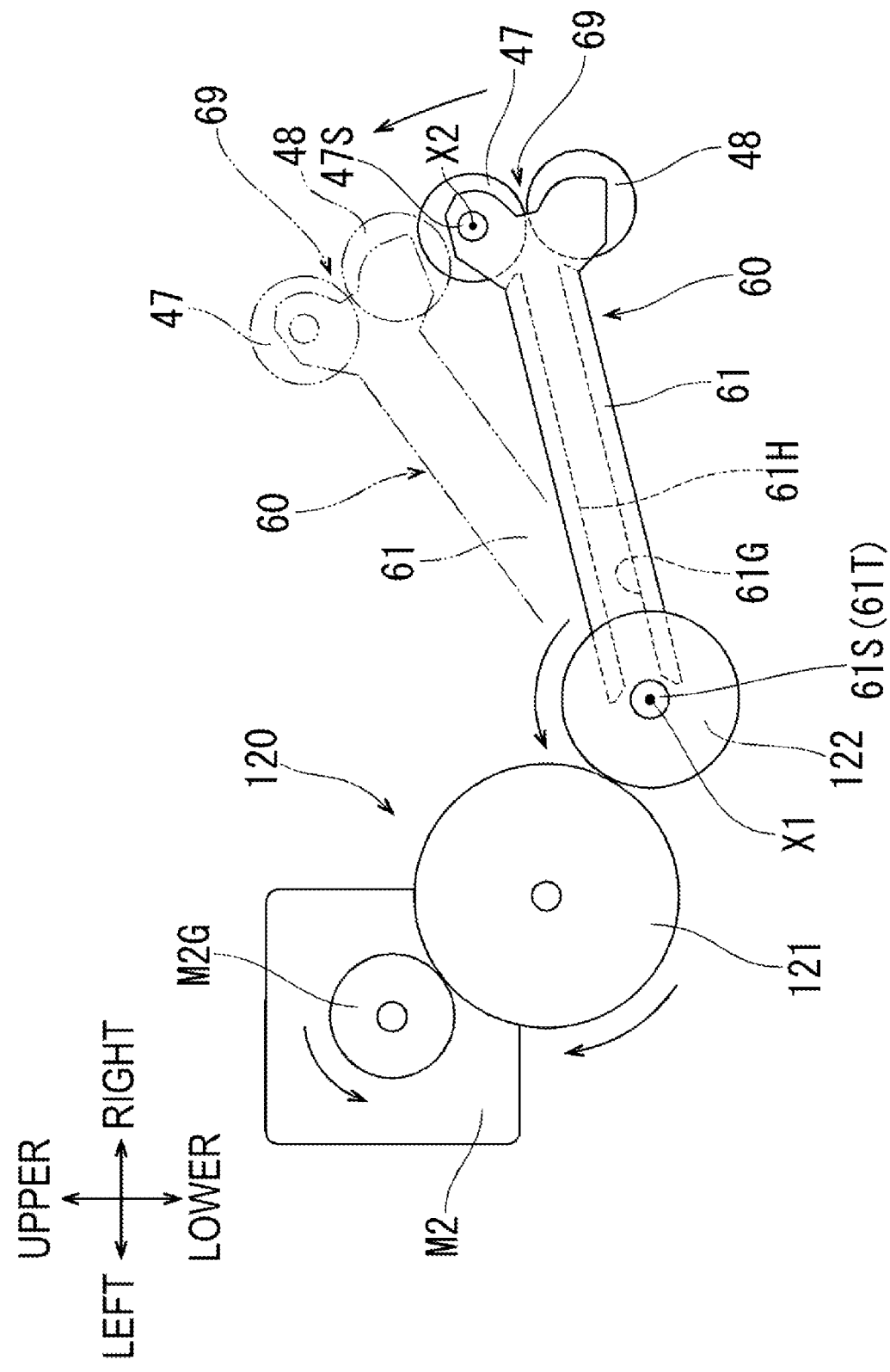
FIG. 9 is a schematic diagram illustrating a discharge unit, a second drive source, a discharge unit drive train and the like as viewed from an arrow Y direction in FIG. 7.

As illustrated in FIGS. 5 and 9, the discharge pinch roller 48 is rotatably supported at a right end part of the discharge guide 61 and is opposite to the discharge roller 47 from below. The conveyance surface 61G and the guide surface 61H of the discharge guide 61 guide the sheet SH toward a nip position between the discharge roller 47 and the discharge pinch roller 48.

As will be described later in detail, the discharge unit 60 is configured to rotate from a third position illustrated in FIGS. 2 and 5 to a fourth position illustrated in FIGS. 3 and 6 by operating the second drive source M2 and a discharge unit rotation drive train 120 illustrated in FIGS. 7 and 9 according to the decrease of the sheets SH supported by the supply tray 91. The fourth position illustrated in FIG. 6 and the like is a position above the third position illustrated in FIG. 5 and the like. In other words, the fourth position is higher than the third position. A position of the discharge unit 60 indicated by a solid line in FIG. 9 is the third position. A position of the discharge unit 60 indicated by a two-dot chain line is the fourth position.

As illustrated in FIG. 7, the supply tray main body 92 includes shaft units 92S and 92T having a rotation axis X92 extending in the front and rear direction as an axis. The front shaft unit 92S is a cylindrical shaft protruding forward from a front and left corner part of the supply tray main body 92. The front shaft unit 92S is rotatably supported by the first side frame 9A. The rear shaft unit 92T is a cylindrical shaft protruding rearward from a rear and left corner part of the supply tray main body 92. The rear shaft unit 92T is rotatably supported by the second side frame 9B. In this manner, the supply tray main body 92 is supported by the housing 90 to be rotatable around the rotation axis X92 and becomes movable between a support position illustrated in FIGS. 1 to 3 and 5 to 7 and an open position illustrated in FIG. 10.

In a state where the supply tray main body 92 is at the support position illustrated in FIG. 5 and the like, the supply tray main body 92 is disposed at a position farther to the right side from the conveyance guide 30 than the movable plate 50, thereby enabling to support the sheet SH together with the movable plate 50. On the other hand, in a state where the supply tray main body 92 is at the open position illustrated in FIG. 10, the supply tray main body 92 is separated upward from the discharge tray 96, thereby opening the discharge port 69. Accordingly, the sheet SH jammed around the discharge port 69 can be easily removed.

As illustrated in FIG. 5, the automatic conveyance mechanism 4 includes a supply roller 41, the separation roller 42, a retard roller 42A, a first conveyance roller 43, a first pinch roller 43P, a second conveyance roller 44, a second pinch roller 44P, the discharge roller 47 and the discharge pinch roller 48 for conveying the sheet SH along the conveyance guide 30. The discharge roller 47 and the discharge pinch roller 48 are a part of the above-mentioned discharge unit 60.

As illustrated in FIG. 7, the rotation shaft 42S of the separation roller 42, a rotation shaft 43S of the first conveyance roller 43 and a rotation shaft 44S of the second conveyance roller 44 are rotatably supported by the first side frame 9A and the second side frame 9B. Respective rear end parts of the rotation shafts 42S, 43S and 44S protrude rearward further than the second side frame 9B.

As illustrated in FIGS. 7 and 8, the automatic conveyance mechanism 4 includes the conveyance drive source M3 and a conveyance drive train 130 for driving the supply roller 41, the separation roller 42, the first conveyance roller 43, the second conveyance roller 44 and the discharge roller 47. Further, in the embodiment, with respect to each gear forming the conveyance drive source M3 and the conveyance drive train 130, illustration of gear teeth formed on the outer peripheral surface is omitted in FIGS. 7 and 8.

As illustrated in FIG. 5, the conveyance drive source M3 is disposed between the first guide 31 and the third guide 33. As illustrated in FIG. 7, the conveyance drive source M3 is mounted on a surface facing a front side of the second side frame 9B. A drive shaft of the conveyance drive source M3 protrudes rearward further than the second side frame 9B and a drive gear M3G is fixed to the drive shaft thereof. In the embodiment, the conveyance drive source M3 is a stepping motor. The conveyance drive source M3 is controlled by the controller 7 to generate a drive force, thereby rotating the drive gear M3G clockwise in FIG. 8.

As illustrated in FIGS. 7 and 8, the conveyance drive train 130 is disposed behind the second side frame 9B and is supported by a plurality of shaft units protruding rearward from the second side frame 9B. The conveyance drive train 130 includes a gear 131 which is positioned on a left and upper side with respect to the drive gear M3G and is engaged with the drive gear M3G; and a plurality of gear groups 132G which transmit a drive force from the conveyance drive source M3 via the gear 131. The plurality of gear groups 132G include a sun gear 132G1 integrally rotating with the gear 131 and a planetary gear 132G3 connected to the sun gear 132G1 by an arm 132G2. Further, the plurality of gear groups 132G include gears 132G4, 132G5, 132G6 and 132G7. The gear 132G4 integrally rotates with the rotation shaft 42S of the separation roller 42 by being engaged with the planetary gear 132G3. The gear 132G5 integrally rotates with the rotation shaft 43S of the first conveyance roller 43 by transmitting the drive force from the gear 132G4 via the gear 132G7. The gear 132G6 integrally rotates with the rotation shaft 44S of the second conveyance roller 44 by transmitting the drive force from the gear 132G4 via the gear 132G7. Further, when the jammed sheet SH is removed in the conveyance guide 30, the planetary gear 132G3 is separated from the gear 132G4 so that the gears 132G4, 132G5 and 132G6 become free to rotate. As a result, the jammed sheet SH can be easily removed.

The plurality of gear groups 132G transmit the drive force from the conveyance drive source M3 to the rotation shaft 42S of the separation roller 42, the rotation shaft 43S of the first conveyance roller 43 and the rotation shaft 44S of the second conveyance roller 44, thereby rotating the separation roller 42, the first conveyance roller 43 and the second conveyance roller 44 in a direction in which the sheet SH is conveyed toward the reading sensor 3S stopped at a stationary reading position, that is, counter-clockwise illustrated in FIG. 8.

Further, the conveyance drive train 130 includes a gear 139 which is positioned rightward with respect to the drive gear M3G and is engaged with the drive gear M3G, a gear 140 which transmits the drive force from the conveyance drive source M3 to the discharge roller 47 via the gear 139, a first discharge roller drive pulley 141, a timing belt 143 and a second discharge roller drive pulley 142.

The gear 140 and the first discharge roller drive pulley 141 are formed as one member. The gear 140 and the first discharge roller drive pulley 141 are inserted into the rear shaft unit 61T of the discharge guide 61 to be rotatable independently. Accordingly, the first discharge roller drive pulley 141 becomes rotatable around the first axis X1 integrally with the gear 140 which is engaged with the gear 139. The timing belt 143 is wound around the first discharge roller drive pulley 141 and the second discharge roller drive pulley 142. The second discharge roller drive pulley 142 is fixed to a rear end part of the rotation shaft 47S of the discharge roller 47. The gears 139 and 140, the first discharge roller drive pulley 141, the timing belt 143 and the second discharge roller drive pulley 142 transmit the drive force from the conveyance drive source M3 to the rotation shaft 47S of the discharge roller 47, thereby rotating the discharge roller 47 in a direction in which the sheet SH is discharged to the discharge tray 96, that is, clockwise in FIG. 8.

An interval between the first axis X1 of the first discharge roller drive pulley 141 and the second axis X2 of the second discharge roller drive pulley 142 does not change even though the discharge guide 61 rotates. Therefore, even when the discharge guide 61 rotates, tension of the timing belt 143 hardly fluctuates and thus, the drive force can be appropriately transmitted from the first discharge roller drive pulley 141 to the second discharge roller drive pulley 142.

As illustrated in FIG. 5, the separation roller 42 is disposed at a position deviated on the left side further than the connection part between the regulation surface 35K and the conveyance surface 35G in the first chute member 35.

A holder 42F is rotatably supported in the rotation shaft 42S of the separation roller 42. The holder 42F protrudes rightward to be separated from the rotation shaft 42S and to exceed the regulation surface 35K.

The supply roller 41 is rotatably held at a right end part of the holder 42F. The supply roller 41 is provided at a position opposite to the movable plate 50 from above. The rotation shaft 42S and a transmission gear group, which is not illustrated and provided inside the holder 42F, transmit the drive force from the conveyance drive source M3 to the supply roller 41, thereby rotating the supply roller 41 in a direction in which the sheet SH supported by the supply tray 91 is sent out to the conveyance guide 30. The supply roller 41 can be displaced in the up and down direction depending on the rotation of the holder 42F.

A holder posture detection sensor 42J is provided in the opening and closing unit 9. The holder posture detection sensor 42J detects whether or not a posture of the holder 42F is an appropriate posture illustrated in FIGS. 5 and 6 and then transmits the detected posture thereof to the controller 7. In a state where the holder 42F is in the appropriate posture illustrated FIGS. 5 and 6, a lower end part of the supply roller 41 has approximately the same height as that of the conveyance surface 35G of the first chute member 35. In this state, the supply roller 41 can appropriately send out the uppermost sheet SH among the sheets SH supported by the supply tray 91 toward the conveyance surface 35G, that is, toward a space between the separation roller 42 and the retard roller 42A.

The retard roller 42A is supported by the first chute member 35 at a position just below the separation roller 42 and is pressed against the separation roller 42. When there exists one sheet SH to be nipped by the separation roller 42 and the retard roller 42A, rotation of the retard roller 42A is allowed by a torque limiter which is not illustrated. On the other hand, when there exist a plurality of sheets SH to be nipped by the separation roller 42 and the retard roller 42A, the rotation of the retard roller 42A is stopped by the torque limiter which is not illustrated. As a result, the retard roller 42A applies a force for stopping the conveyance of the sheet SH with respect to the sheet SH other than the sheet SH in contact with the separation roller 42.

The first conveyance roller 43 is disposed at a connection part between the first guide 31 and the second guide 32 to be opposite to the conveyance surface 35G of the first chute member 35 from above. The first pinch roller 43P is supported by the first chute member 35 and is pressed against the first conveyance roller 43. The first conveyance roller 43 and the first pinch roller 43P nip the sheet SH separated one by one by the separation roller 42 and the retard roller 42A and then convey the nipped sheet SH toward the second guide 32.

The second conveyance roller 44 is disposed at a connection part between the second guide 32 and the third guide 33 to be opposite to the guide surface 36G of the second chute member 36 from below. The second pinch roller 44P is supported by the second chute member 36 and is pressed against the second conveyance roller 44. The second conveyance roller 44 and the second pinch roller 44P nip the sheet SH to be conveyed by the first conveyance roller 43 and the first pinch roller 43p and then convey the nipped sheet SH toward the reading surface 8B, that is, toward the reading sensor 3S which is stopped at the stationary reading position.

The discharge roller 47 and the discharge pinch roller 48 nip the sheet SH which passes over the reading surface 8B and is guided by the discharge guide 61, after which the nipped sheet SH is discharged from the discharge port 69 toward the discharge tray 96.

<Configurations of First Drive Source and First Drive Train>

As illustrated in FIGS. 5 to 7 and 10, the automatic conveyance mechanism 4 includes the first drive source M1 and the first drive train 110 for performing a rotation operation of the movable plate 50. Further, in the embodiment, with respect to each gear forming the first drive source M1 and the first drive train 110, the illustration of gear teeth formed on the outer peripheral surface is omitted in FIG. 5 and the like.

As illustrated in FIGS. 5 and 7 and the like, the first drive source M1 is disposed on a rear surface side of the supply tray main body 92 and is mounted on a position close to the rear shaft unit 92T of the supply tray main body 92. The drive gear M1G is fixed to a drive shaft protruding rearward of the first drive source M1. In the embodiment, the first drive source M1 is a stepping motor. The first drive source M1 is controlled by the controller 7 to generate a drive force and then rotates the drive gear M1G clockwise in FIG. 5. Further, in the embodiment, the controller 7 does not rotate the drive gear M1G counter-clockwise in FIG. 5.

The first drive train 110 includes a gear 113, a first gear 111, a second gear 112, a worm gear 115, a worm wheel gear 116, gears 117 and 118 and a cam 150. The gears 117 and 118 and the cam 150 are examples of the "a first action part" of this disclosure. In the embodiment, each gear such as the first gear 111 and the second gear 112 forming the first drive train 110 is a general gear such as a spur gear, a helical gear and the like.

The gear 113 and the first gear 111 are provided on the rear surface side of the supply tray main body 92. The gear 113 is positioned leftward and downward with respect to the drive gear M1G and is engaged with the drive gear M1G. The first gear 111 is positioned leftward and downward with respect to the gear 113 and is engaged with the gear 113.

The first gear 111 is rotationally driven by the drive force transmitted from the first drive source M1 via the drive gear M1G and the gear 113. In this case, the first gear 111 also rotates in the clockwise direction in FIG. 5 by the drive gear M1G rotating in the clockwise direction in FIG. 5. A rotation direction of the first gear 111 is the same as a direction in which the supply tray main body 92 rotates from the open position illustrated in FIG. 10 to the support position illustrated in FIG. 5 and the like.

The second gear 112, the worm gear 115, the worm wheel gear 116, the gears 117 and 118 and the cam 150 are provided on an upper surface side of a base unit 90A forming a part of the internal frame of the housing 90. The base unit 90A is disposed at a position opposite to a right portion of the movable plate 50 from below. Further, the base unit 90A extends in an approximately flat plate shape in the front and rear direction and the left and right direction at a position rightward and upward further than the discharge unit 60.

The second gear 112 is disposed at a position close to the rear shaft unit 50T of the movable plate 50. A rotation shaft 112S of the second gear 112 is rotatably supported by the base unit 90A via a shaft support part which is not illustrated. As illustrated in FIG. 7, the rotation shaft 112S of the second gear 112 extends forward from the second gear 112 in parallel with the third axis X3 and reaches a central part in the front and rear direction of the movable plate 50.

In the state where the supply tray main body 92 is at the support position illustrated in FIG. 5 and the like, the second gear 112 is positioned leftward and downward with respect to the first gear 111 and is engaged with the first gear 111. On the other hand, in the state where the supply tray main body 92 is at the open position illustrated in FIG. 10, the second gear 112 is separated from the first gear 111.

The worm gear 115 is fixed to a front end part of the rotation shaft 112S of the second gear 112, thereby becoming rotatable integrally with the second gear 112. The worm wheel gear 116 is positioned on the left side with respect to the worm gear 115 and is engaged with the worm gear 115. A first rotation axis X116 of the worm wheel gear 116 extends in a direction orthogonal to the front and rear direction in which the rotation shaft 112S of the second gear 112 extends, that is, in the up and down direction.

The gear 117 is provided on a lower surface side of the worm wheel gear 116. The gear 117 has a diameter smaller than that of the worm wheel gear 116 and becomes rotatable around the first rotation axis X116 integrally with the worm wheel gear 116.

The gear 118 is positioned on the left side with respect to the gear 117 and is engaged with the gear 117. The cam 150 is provided on an upper surface side of the gear 118. The gear 118 has a diameter larger than that of the gear 117 and is rotatable around a second rotation axis X150 integrally with the cam 150. The second rotation axis X150 of the cam 150 extends in parallel with the first rotation axis X116, that is, in the up and down direction.

In the state where the supply tray main body 92 is at the support position illustrated in FIG. 5 and the like, the second gear 112 is rotationally driven by the drive force transmitted from the first drive source M1 via the drive gear M1G, the gear 113 and the first gear 111. The worm gear 115, the worm wheel gear 116 and the gears 117 and 118 are rotationally driven by the second gear 112. In this case, the gear 118 and the cam 150 rotate clockwise in FIG. 7 by the drive gear M1G rotating clockwise in FIG. 5. Further, in the embodiment, since the drive gear M1G does not rotate counter-clockwise in FIG. 5, the gear 118 and the cam 150 also do not rotate counter-clockwise in FIG. 7. That is, the gear 118 and the cam 150 rotate in one direction DR1 around the second rotation axis X150.

As FIG. 5 illustrates a side view of the cam 150, FIG. 6 illustrates a side view of a different posture of the cam 150 in FIG. 5 and FIG. 7 illustrates a top view of the cam 150, the cam 150 is an approximately trapezoidal rib protruding upward from an upper surface of the gear 118. As illustrated in FIG. 7, the cam 150 extends in an arc shape centering on the second rotation axis X150. A flat surface 153, a first inclined surface 151 and a second inclined surface 152 are formed on an end surface facing an upper part of the cam 150.

The flat surface 153 extends approximately in parallel with the upper surface of the gear 118. The first inclined surface 151 is inclined to connect the upper surface of the gear 118 and the flat surface 153 at a position where the first inclined surface 151 advances clockwise in FIG. 7 further than the flat surface 153. The second inclined surface 152 is inclined in a direction opposite to the first inclined surface 151 to connect the upper surface of the gear 118 and the flat surface 153 at a position where the second inclined surface 152 advances counter-clockwise in FIG. 7 further than the flat surface 153.

An inclination angle α1 of the first inclined surface 151 illustrated in FIG. 6 is set to be smaller than an inclination angle α2 of the second inclined surface 152 illustrated in FIG. 5. That is, the first inclined surface 151 is inclined more gently than the second inclined surface 152. In other words, as illustrated in FIG. 7, when the first inclined surface 151 and the second inclined surface 152 are viewed from above, a length in a circumferential direction of the second rotation axis X150 on the first inclined surface 151 is larger than a length in a circumferential direction of the second rotation axis X150 on the second inclined surface 152.

The movable plate 50 includes a passive unit 53. The passive unit 53 is a convex part protruding downward from a rear surface of the right portion of the movable plate 50. When the gear 118 and the cam 150 rotate in one direction DR1 by the rotation of the worm wheel gear 116, the passive unit 53 can repeatedly abut on the upper surface of the gear 118, the first inclined surface 151 of the cam 150, the flat surface 153 of the cam 150 and the second inclined surface 152 of the cam 150 in this order.

Next, an operation of the first drive train 110 will be described. When the first drive source M1 rotates the drive gear M1G clockwise in FIG. 5, the first drive train 110 transmits the drive force from the first drive source M1 to the movable plate 50, thereby rotating the movable plate 50 from the first position illustrated in FIGS. 2 and 5 to the second position illustrated in FIGS. 3 and 6.

More specifically, as illustrated in FIG. 5, in a state where the passive unit 53 of the movable plate 50 abuts on the upper surface of the gear 118, the movable plate 50 is disposed at the first position. When the gear 118 and the cam 150 rotate in one direction DR1 by operating the first drive source M1 and the first drive train 110, the passive unit 53 of the movable plate 50 abuts on the first inclined surface 151 of the cam 150 and is pushed up. Thus, the movable plate 50 rotates around the third axis X3 to displace the left end part thereof upward and then moves toward the second position illustrated in FIG. 6.

When the gear 118 and the cam 150 further rotate in one direction DR1, as illustrated in FIG. 6, since the passive unit 53 of the movable plate 50 abuts on the flat surface 153 of the cam 150, the movable plate 50 moves to the second position illustrated in FIG. 6 and the like and then is maintained in a state of the second position.

When the gear 118 and the cam 150 further rotate in one direction DR1, the passive unit 53 of the movable plate 50 abuts on the second inclined surface 152 of the cam 150 and then descends. Accordingly, the movable plate 50 rotates around the third axis X3 to displace the left end part thereof downward and then moves toward the first position illustrated in FIG. 5 and the like.

When the cam 150 further rotates in one direction DR1, as illustrated in FIG. 5, since the passive unit 53 of the movable plate 50 abuts on the upper surface of the gear 118, the movable plate 50 moves to the first position illustrated in FIG. 5 and the like and then is maintained in a state of the first position.

Figure 10:
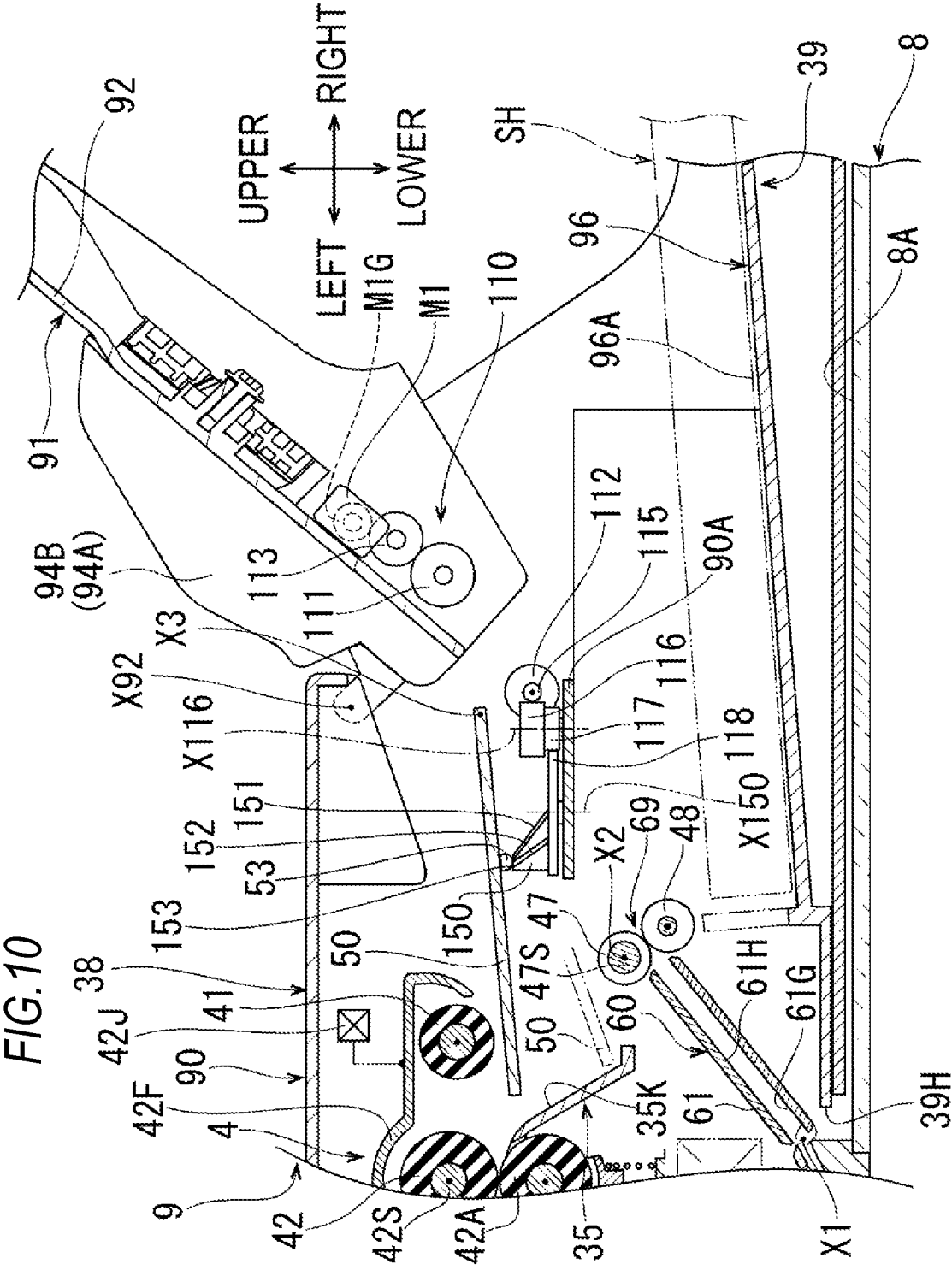
FIG. 10 is a partial cross-sectional view illustrating the image reading apparatus according to the first embodiment and is a diagram illustrating the first drive source, the first drive train and the like in a state where a supply tray main body is at an open position.

In the state where the passive unit 53 of the movable plate 50 abuts on the first inclined surface 151 of the cam 150, the flat surface 153 thereof or the second inclined surface 152 thereof, when the supply tray main body 92 moves to the open position illustrated in FIG. 10, the second gear 112 is separated from the first gear 111 and the first drive train 110 is divided. Therefore, the movable plate 50 attempts to fall by the own weight and applies a force for rotating the gear 118 and the cam 150 in one direction DR1 or the opposite direction. However, since the worm gear 115 and the worm wheel gear 116 are self-locked when the applied force is transmitted to the worm gear 115 and the worm wheel gear 116, the movable plate 50 does not fall.

<Configurations of Second Drive Source and Discharge Unit Rotation Drive Train>

As illustrated in FIGS. 7 and 9, the automatic conveyance mechanism 4 includes the second drive source M2 and the discharge unit rotation drive train 120 for performing a rotation operation of the discharge unit 60. Further, in the embodiment, with respect to each gear forming the second drive source M2 and the discharge unit rotation drive train 120, illustration of gear teeth formed on the outer peripheral surface is omitted in FIGS. 7 and 9.

As illustrated in FIG. 5, the second drive source M2 is disposed between the first guide 31 and the third guide 33. As illustrated in FIG. 7, the second drive source M2 is mounted on a surface facing the rear side of the first side frame 9A. A drive shaft of the second drive source M2 protrudes forward further than the first side frame 9A and a drive gear M2G is fixed to the drive shaft. In the embodiment, the second drive source M2 is a stepping motor. The second drive source M2 is controlled by the controller 7 to generate a drive force, thereby rotating the drive gear M2G clockwise and counter-clockwise in FIG. 9.

A plurality of arrows illustrated in FIG. 9 indicate a rotation direction when the drive gear M2G rotates counter-clockwise in FIG. 9. Further, when the drive gear M2G rotates clockwise in FIG. 9, the rotation direction becomes a rotation direction opposite to each arrow illustrated in FIG. 9.

As illustrated in FIGS. 7 and 9, the discharge unit rotation drive train 120 is disposed forward further than the first side frame 9A and is supported by a plurality of shaft units protruding forward from the first side frame 9A.

The discharge unit rotation drive train 120 includes gears 121 and 122. The gear 121 is positioned rightward and downwards with respect to the drive gear M2G and is engaged with the drive gear M2G. The gear 122 is fixed to the front shaft unit 61S of the discharge guide 61 to be integrally rotatable. The gear 122 is positioned rightward and downward with respect to the gear 121 and is engaged with the gear 121. When the gear 122 rotates, the discharge guide 61 and the discharge roller 47 and the discharge pinch roller 48 which are supported by the discharge guide 61 rotate integrally with the gear 122. In the embodiment, the gears 121 and 122 are general gears such as a spur gear and a helical gear.

Next, an operation of the discharge unit rotation drive train 120 will be described. When the second drive source M2 rotates the drive gear M2G counter-clockwise in FIG. 9, the discharge unit rotation drive train 120 transmits the drive force from the second drive source M2 to the discharge unit 60, thereby rotating the discharge unit 60 from the third position illustrated in FIG. 5 and the like to the fourth position illustrated in FIG. 6 and the like. In FIG. 9, the discharge unit 60 rotates from the third position indicated by a solid line to the fourth position indicated by a two-dot chain line.

More specifically, in the discharge unit rotation drive train 120, the gear 121 engaged with the drive gear M2G rotates clockwise in FIG. 9 and the gear 122 engaged with the gear 121 rotates counter-clockwise in FIG. 9. As a result, since the discharge guide 61 rotates upward integrally with the gear 122, the discharge unit 60 rotates around the first axis X1 to displace the discharge port 69 upward and then moves to the fourth position illustrated in FIG. 6 and the like.

Further, when the second drive source M2 rotates the drive gear M2G clockwise illustrated in FIG. 9, the discharge unit rotation drive train 120 operates in a direction opposite to the above-mentioned operation and the gear 122 rotates clockwise in FIG. 9. As a result, since the discharge guide 61 rotates downward integrally with the gear 122, the discharge unit 60 rotates around the first axis X1 to displace the discharge port 69 downward and then moves to the third position illustrated in FIG. 5 and the like.

As illustrated in FIG. 5, in the state where the movable plate 50 is at the first position, the left end part of the movable plate 50 is at a position opposite to a lower end part of the regulation surface 35K of the first chute member 35 and the inclination angle of an upper surface of the movable plate 50 is approximately the same as the inclination angle of an upper surface of the supply tray main body 92. In this state, the supply tray 91 can support the sheet SH with the maximum number of stacked sheets. When the movable plate 50 is at the first position and the supply roller 41 abuts on the uppermost sheet SH of the maximum number of stacked sheets SH, the posture of the holder 42F becomes the appropriate posture illustrated in FIG. 5.

As illustrated in FIG. 6, in the state where the movable plate 50 is at the second position, the left end part of the movable plate 50 is at a position opposite to an upper end part of the regulation surface 35K of the first chute member 35 and the upper surface of the movable plate 50 becomes a state of extending approximately horizontally at the same height as that of the conveyance surface 35G of the first chute member 35. In this state, the supply tray 91 supports one to several number of the sheets SH. When the movable plate 50 is at the second position and the supply roller 41 abuts on the uppermost sheet SH of one to several number of the sheets SH, the posture of the holder 42F becomes the appropriate posture illustrated in FIG. 6.

When it is determined that the posture of the holder 42F is in a state of descending beyond an allowable range from the appropriate posture illustrated in FIGS. 5 and 6 based on a detection signal of the holder posture detection sensor 42J, the controller 7 operates the first drive source M1 and then rotates the movable plate 50 little by little from the first position illustrated in FIG. 5 and the like to the second position illustrated in FIG. 6 and the like, thereby controlling the holder 42F to maintain the appropriate posture illustrated in FIGS. 5 and 6. At this time, it is possible to determine the position of the movable plate 50 in the desired rotation posture with high accuracy by finely changing a rotation angle of the cam 150 by rotation angle control of the first drive source M1 which is the stepping motor and by finely changing an abutting position between the first inclined surface 151 of the cam 150 and the passive unit 53 of the movable plate 50. Particularly, since the first inclined surface 151 is inclined more gently than the second inclined surface 152, it is possible to determine the position of the movable plate 50 in the desired rotation posture with higher accuracy.

Further, the controller 7 appropriately operates the second drive source M2 according to upward rotation of the movable plate 50. The drive force from the second drive source M2 is transmitted to the discharge unit 60 by the discharge unit rotation drive train 120. Accordingly, the discharge unit 60 rotates little by little from the third position illustrated in FIG. 5 and the like to the fourth position illustrated in FIG. 6 and the like to approach an empty space after the movable plate 50 moves. Accordingly, the image reading apparatus 1 achieves miniaturization in the up and down direction by a configuration in which the discharge unit 60 rotates according to the rotation of the movable plate 50 of the supply tray 91.

As illustrated in FIG. 5, when the discharge unit 60 is at the third position, the discharge port 69, the discharge roller 47 and the discharge pinch roller 48 are at positions close to the sheet supporting surface 96A of the discharge tray 96. A state of the discharge unit 60 corresponds to a case in which the number of sheets SH supported by the sheet supporting surface 96A of the discharge tray 96 is small.

As illustrated in FIG. 6, when the discharge unit 60 is at the fourth position, the discharge port 69, the discharge roller 47 and the discharge pinch roller 48 are at positions separated upward from the sheet supporting surface 96A of the discharge tray 96. A state of the discharge unit 60 corresponds to a case in which the sheets SH are supported by the sheet supporting surface 96A of the discharge tray 96 with the maximum number of stacked sheets. In other words, in this state, the discharge port 69 of the discharge unit 60 is sufficiently separated upward from the uppermost sheet SH among the sheets SH supported by the sheet supporting surface 96A with the maximum number of stacked sheets.

<Image Reading Operation>

In the image reading apparatus 1, when reading an image on a document supported by the document supporting surface 8A, the controller 7 operates the scanning mechanism, which is not illustrated, by controlling the scanning mechanism drive source 3M of the reading unit 3 and moves the reading sensor 3S in the left and right direction from a reading start position below a left end edge of the document supporting surface 8A to a reading end position below a right end edge thereof. Accordingly, the reading sensor 3S reads the image on the document supported by the document supporting surface 8A. Thereafter, the controller 7 operates the scanning mechanism, which is not illustrated, in a reverse direction by controlling the scanning mechanism drive source 3M of the reading unit 3 and then moves the reading sensor 3S which completes the reading from a right end to a left end in the reading unit 3, thereby returning to a standby position.

Further, in the image reading apparatus 1, the sheet SH supported by the supply tray 91 is conveyed by the automatic conveyance mechanism 4; when reading the image on the sheet SH, the controller 7 operates the scanning mechanism, which is not illustrated, by controlling the scanning mechanism drive source 3M of the reading unit 3; and the reading sensor 3S is stopped at the stationary reading position below the reading surface 8B. Here, it is assumed that the movable plate 50 is at the first position illustrated in FIG. 5 and the like, the discharge unit 60 is at the third position illustrated in FIG. 5 and the like and the sheet SH is in a state of not being supported by the discharge tray 96.

Next, the controller 7 determines whether or not the holder posture detection sensor 42J is in the appropriate posture illustrated in FIGS. 5 and 6 based on the detection signal of the holder posture detection sensor 42J. When the holder posture detection sensor 42J is not in the appropriate posture illustrated in FIGS. 5 and 6, the controller 7 operates the first drive source M1 and the first drive train 110. Then, the controller 7 rotates the movable plate 50 little by little from the first position illustrated in FIG. 5 and the like to the second position illustrated in FIG. 6 and the like and then controls the holder 42F to maintain the appropriate posture thereof illustrated in FIGS. 5 and 6. Further, the controller 7 appropriately operates the second drive source M2 and the discharge unit rotation drive train 120 according to the upward rotation of the movable plate 50. As a result, the discharge unit 60 rotates little by little from the third position illustrated in FIG. 5 and the like to the fourth position illustrated in FIG. 6 and the like.

Next, the controller 7 operates the conveyance drive source M3 and the conveyance drive train 130. Accordingly, the controller 7 drives the supply roller 41, the separation roller 42, the first conveyance roller 43, the second conveyance roller 44 and the discharge roller 47 and then supplies the sheet SH supported by the supply tray 91 to the conveyance guide 30 to sequentially convey the supplied sheet SH along the conveyance guide 30. When the conveyed sheet SH passes over the reading surface 8B, the controller 7 reads an image on the conveyed sheet SH by the reading sensor 3S which is stopped at the stationary reading position. Next, the controller 7 discharges the sheet SH whose image is read out from the discharge port 69 toward the discharge tray 96 by the discharge guide 61 of the discharge unit 60, the discharge roller 47 thereof and the discharge pinch roller 48 thereof.

Meanwhile, the controller 7 operates the first drive source M1 and the first drive train 110 according to the decrease of the sheets SH supported by the supply tray 91 based on the detection signal of the holder posture detection sensor 42J, thereby rotating the movable plate 50 little by little toward the second position illustrated in FIG. 6 and the like. Further, the controller 7 appropriately operates the second drive source M2 and the discharge unit rotation drive train 120 according to the upward rotation of the movable plate 50, thereby rotating the discharge unit 60 little by little toward the fourth position illustrated in FIG. 6 and the like. As illustrated in FIG. 6, when the number of sheets SH supported by the supply tray 91 decreases and the sheet SH runs out, the controller 7 stops the conveyance drive source M3 and terminates the image reading operation.

Thereafter, the controller 7 operates the scanning mechanism, which is not illustrated, by controlling the scanning mechanism drive source 3M of the reading unit 3 and then returns the reading sensor 3S to the standby position. Further, after confirming that the sheet SH is not supported by the discharge tray 96 with a detection means which is not illustrated, the controller 7 operates the first drive source M1 and the first drive train 110 to return the movable plate 50 to the first position illustrated in FIG. 5 and the like and the controller 7 operates the second drive source M2 and the discharge unit rotation drive train 120 to return the discharge unit 60 to the third position illustrated in FIG. 5 and the like.

<Operational Effect>

In the image reading apparatus 1 of the first embodiment, a drive system of the movable plate 50, that is, the first drive source M1 and the first drive train 110; and a drive system of the discharge unit 60, that is, the second drive source M2 and the discharge unit rotation drive train 120 are separately provided. Therefore, an influence of the discharge unit 60 is hardly received when the moving amount of the movable plate 50 is designed. Further, an influence of the movable plate 50 is hardly received when the moving amount of the discharge unit 60 is designed.

Specifically, a moving amount L1 of the movable plate 50 illustrated in FIG. 6 can be easily designed to have the desired size by appropriately selecting a size of the drive gear M1G of the first drive source M1 and sizes of the gear 113, the first gear 111, the second gear 112, the worm gear 115, the worm wheel gear 116, the gears 117 and 118 and the cam 150, which form the first drive train 110. Further, a moving amount L2 of the discharge unit 60 illustrated in FIG. 6 can be easily designed to have the desired size by appropriately selecting a size of the drive gear M2G of the second drive source M2 and sizes of the gears 121 and 122, which form the discharge unit rotation drive train 120.

Therefore, in the image reading apparatus 1 according to the first embodiment, the moving amount of the movable plate 50 and the moving amount of the discharge unit 60 can be designed according to the respectively required specifications.

Further, in the image reading apparatus 1, as illustrated in FIGS. 5 and 7 and the like, the first drive source M1 is mounted on the supply tray 91, more specifically, on the supply tray main body 92. According to the aforementioned configuration, the first drive source M1 is at a position apart from the second drive source M2 and is disposed at an empty space around the supply tray 91. As a result, in the image reading apparatus 1, it is possible to prevent an increase in a device size by effectively utilizing the empty space in comparison with a case in which the first drive source M1 and the second drive source M2 are disposed collectively.

Further, in the image reading apparatus 1, when the sheet SH is jammed around the discharge port 69, the jammed sheet SH can be easily removed by moving the supply tray main body 92 to the open position illustrated in FIG. 10.

Further, in the image reading apparatus 1, as illustrated in FIG. 10, when the supply tray main body 92 moves to the open position, although the second gear 112 is separated from the first gear 111 and the first drive train 110 is divided, the movable plate 50 can be prevented from falling by the self-lock of the worm gear 115 and the worm wheel gear 116.

Further, in the image reading apparatus 1, as illustrated in FIGS. 5 and 7 and the like, since the first action part includes the cam 150, it is not necessary to change a rotation axis on an output side of the first action part to a direction orthogonal to the first rotation axis X116 of the worm wheel gear 116. As a result, the first action part can be simplified.

Further, in the image reading apparatus 1, the cam 150 rotates around the second rotation axis X150 in one direction DR1 and further, the first inclined surface 151 is inclined more gently than the second inclined surface 152. According to this configuration, since the first inclined surface 151 gently pushes up the passive unit 53 of the movable plate 50, the movable plate 50 can be moved from the first position illustrated in FIG. 5 and the like to the second position illustrated in FIG. 6 and the like with higher accuracy during the image reading operation. Further, since the second inclined surface 152 quickly lowers the passive unit 53 of the movable plate 50, the movable plate 50 can be quickly moved from the second position illustrated in FIG. 6 and the like to the first position illustrated in FIG. 5 and the like after the termination of the image reading operation.

Further, in the image reading apparatus 1, the rotation direction of the first gear 111, that is, the clockwise direction in FIG. 5 is the same as the direction in which the supply tray main body 92 rotates from the open position illustrated in FIG. 10 to the support position illustrated in FIG. 5 and the like. That is, the rotation direction of the first gear 111 is a rotation direction into which the second gear 112 bites.

Accordingly, when the first drive source M1 is operated, the supply tray main body 92 hardly deviates from the support position illustrated in FIG. 5 and the like.

Second Embodiment

Figure 11:
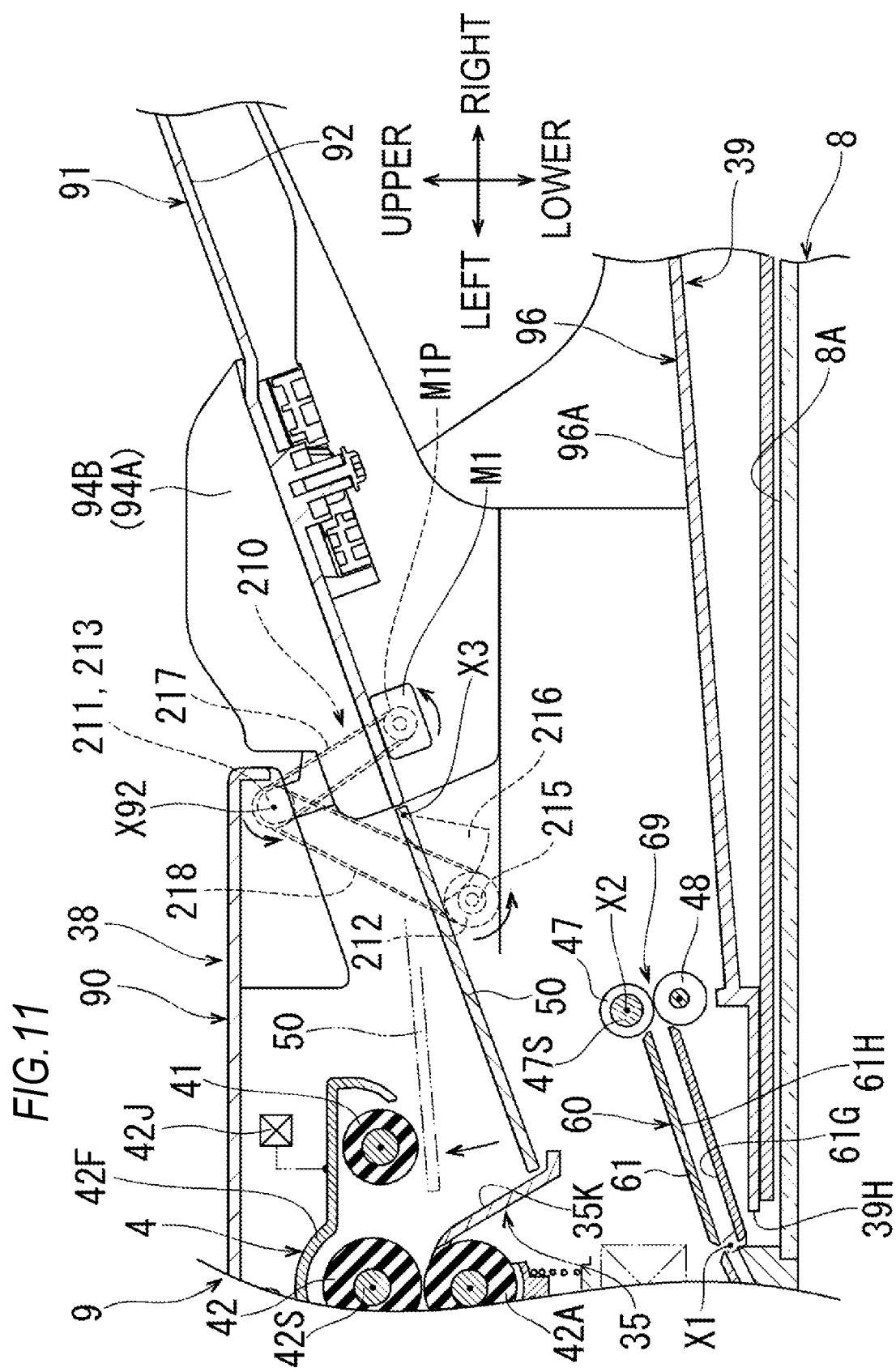
Figure 12:
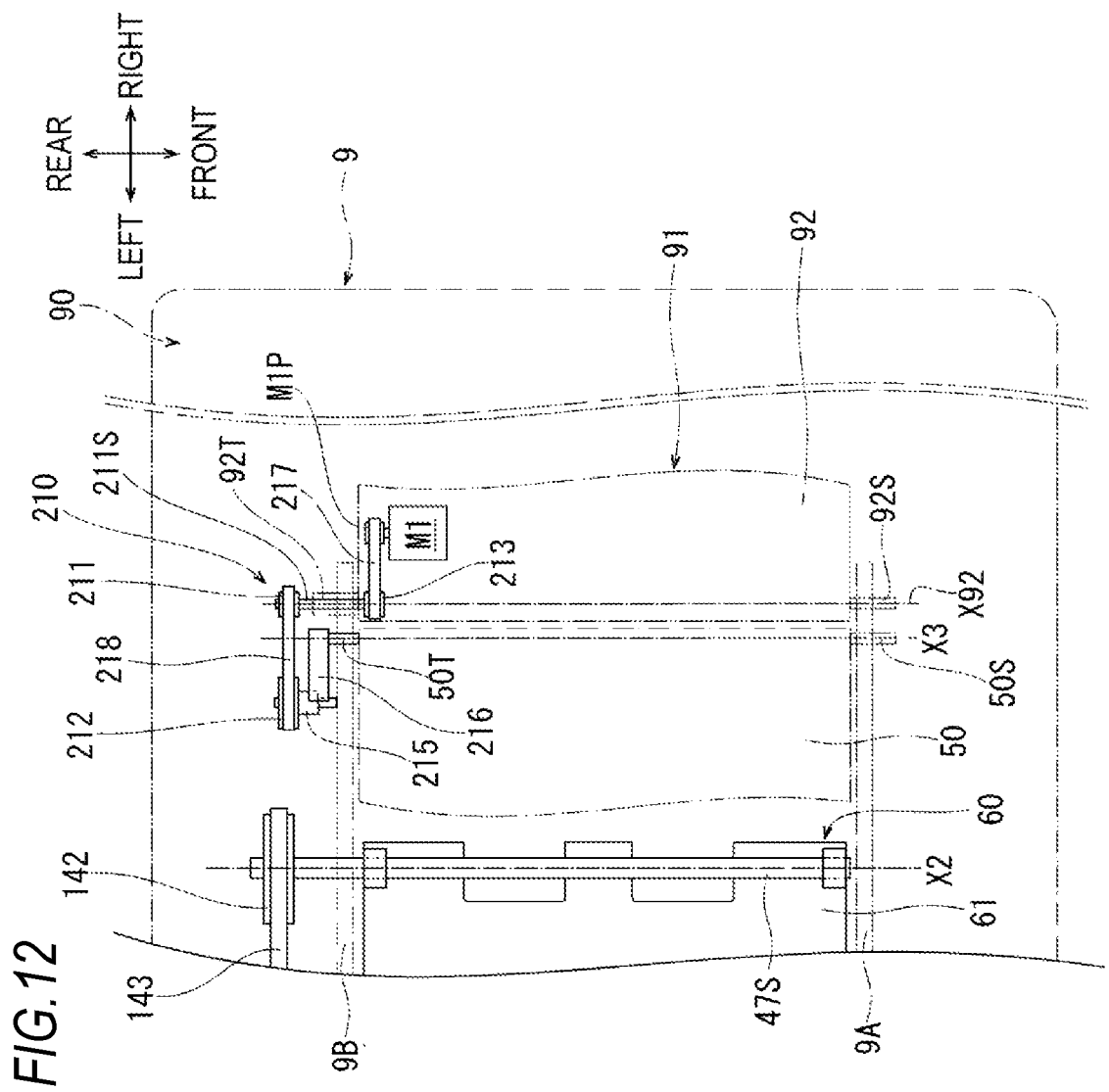
FIG. 12 is a partial top view schematically illustrating the image reading apparatus according to the second embodiment.
Figure 13:
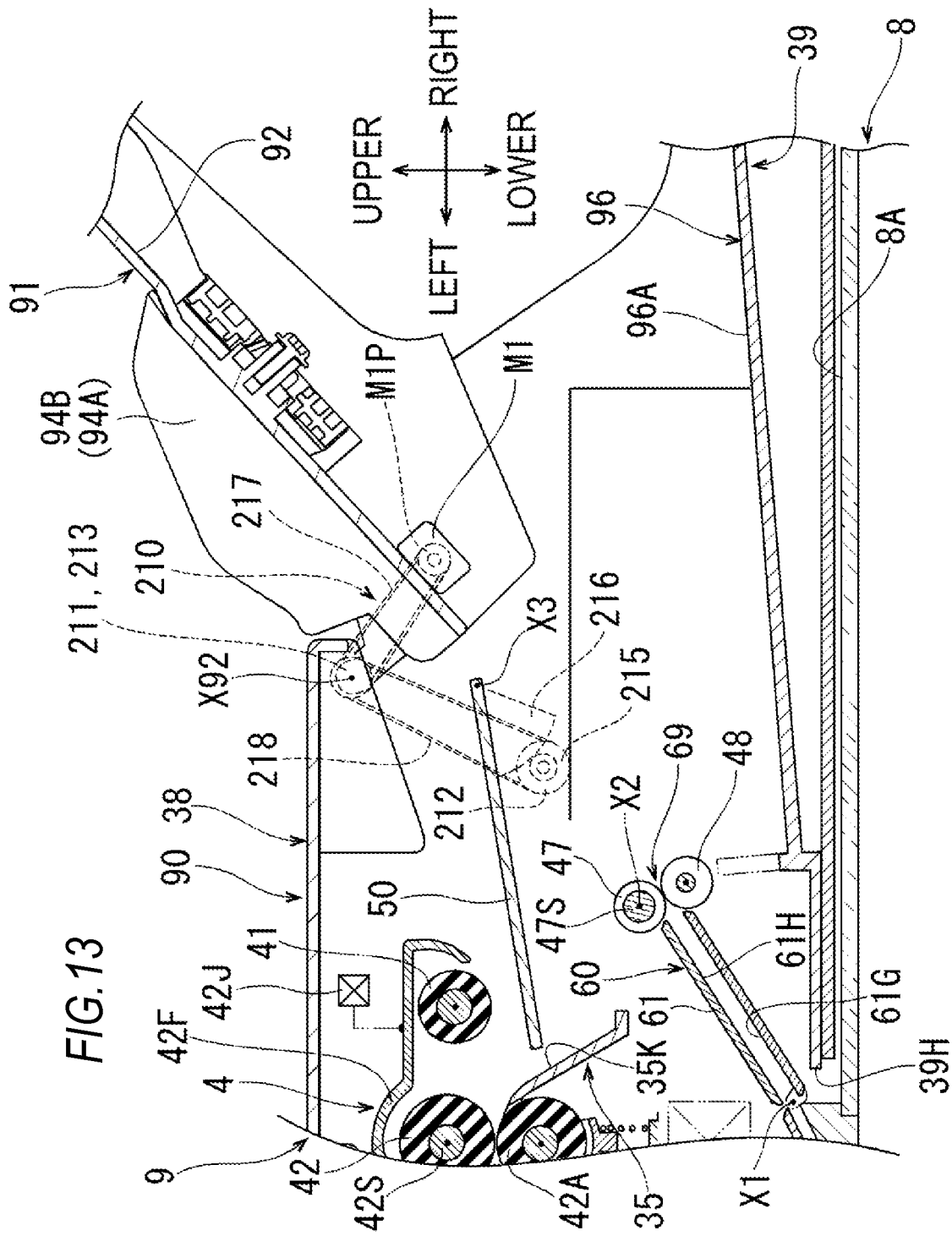
FIG. 13 is a partial cross-sectional view illustrating the image reading apparatus according to the second embodiment and is a diagram illustrating the first drive source, the second drive train and the like in a state where a supply tray main body is at an open position.

As illustrated in FIGS. 11 to 13, in an image reading apparatus according to a second embodiment, a drive pulley M1P is employed instead of the drive gear M1G of the first drive source M1 according to the first embodiment. Further, in the image reading apparatus, a second drive train 210 is employed instead of the first drive train 110 according to the first embodiment. Further, in the image reading apparatus, the base unit 90A and the passive unit 53 of the movable plate 50 according to the first embodiment are eliminated. Other configurations of the second embodiment are the same as those of the first embodiment. Therefore, the same reference signs are denoted to the same configurations as those of the first embodiment and descriptions thereof will be omitted or simplified.

The first drive source M1 is controlled by the controller 7 to generate the drive force, thereby rotating the drive pulley M1P clockwise and the counter-clockwise in FIG. 11.

As illustrated in FIGS. 11 and 12, the second drive train 210 includes a pulley 213, a first pulley 211, a second pulley 212, timing belts 217 and 218, a gear 215 and a fan-shaped gear 216. The first pulley 211 is an example of a "first rotation body" of this disclosure. The second pulley 212 is an example of a "second rotation body" of this disclosure. The gear 215 and the fan-shaped gear 216 are examples of a "second action part" of this disclosure.

As illustrated in FIG. 12, the pulley 213 and the first pulley 211 are connected to each other by a rotation shaft 211S extending in the front and rear direction in parallel with the third axis X3. The rear shaft unit 92T of the supply tray main body 92 is changed to a cylindrical shape in which a through hole penetrating in the front and rear direction is formed. The rotation shaft 211S is inserted into the through hole of the rear shaft unit 92T and is rotatably supported around the rotation axis X92 independently from the supply tray main body 92.

A front end part of the rotation shaft 211S protrudes forward further than the rear shaft unit 92T. The pulley 213 is fixed to the front end part of the rotation shaft 211S. The timing belt 217 is wound around the drive pulley M1P and the pulley 213. As illustrated in FIG. 11, the pulley 213 and the timing belt 217 are disposed rearward further than a width regulation guide 94B on the rear side.

As illustrated in FIG. 12, a rear end part of the rotation shaft 211S protrudes rearward further than the rear shaft unit 92T and the second side frame 9B. The first pulley 211 is fixed to the rear end part of the rotation shaft 211S.

The second pulley 212, the gear 215 and the fan-shaped gear 216 are provided on a surface side facing a rear side of the second side frame 9B. The second pulley 212 and the gear 215 are formed as one member and are rotatably supported by the second side frame 9B at a position leftward and downward further than the first pulley 211. The timing belt 218 is wound around the first pulley 211 and the second pulley 212. The fan-shaped gear 216 is fixed to the rear shaft unit 50T of the movable plate 50. The fan-shaped gear 216 is positioned rightward and upward with respect to the gear 215 and is engaged with the gear 215.

As illustrated in FIG. 11, as the first drive source M1 rotates the drive pulley M1P counter-clockwise in FIG. 11, the pulley 213, the first pulley 211, the second pulley 212 and the gear 215 also rotate counter-clockwise in FIG. 11, thereby rotating the fan-shaped gear 216 clockwise in FIG. 11. As a result, the movable plate 50 moves from the first position indicated by the solid line in FIG. 11 to the second position indicated by the two-dot chain line in FIG. 11.

On the other hand, as the first drive source M1 rotates the drive pulley M1P clockwise in FIG. 11, the pulley 213, the first pulley 211, the second pulley 212 and the gear 215 also rotate clockwise in FIG. 11, thereby rotating the fan-shaped gear 216 counter-clockwise in FIG. 11. As a result, the movable plate 50 moves from the second position indicated by the two-dot chain line in FIG. 11 to the first position indicated by the solid line in FIG. 11.

As illustrated in FIG. 13, the second drive train 210 is not divided even though the supply tray main body 92 moves to the open position. Further, the movable plate 50 does not fall by a braking action of the first drive source M1 which is not in operation.

In the same manner as that of the image reading apparatus 1 according to the first embodiment, the image reading apparatus having the above-mentioned configurations according to the second embodiment can design the moving amount of the movable plate 50 and the moving amount of the discharge unit 60 according to the respectively required specifications.

Further, in the image reading apparatus, since the second drive train 210 is not divided even though the supply tray main body 92 moves to the open position illustrated in FIG. 13, it is possible to prevent the movable plate 50 from falling.

As described above, this disclosure is described according to the first and second embodiments, but this disclosure is not limited to the first and second embodiments and it goes without saying that this disclosure can be applied by being appropriately modified within the scope not deviated from the gist thereof.

For example, although the first drive source M1 is provided in the supply tray main body 92 in the first and second embodiments, this disclosure is not limited to this configuration. This disclosure includes a configuration in which the first drive source is provided in the movable plate of the supply tray and a configuration in which the first drive source is provided in the housing.

Although the first action part includes the cam 150 in the first embodiment, this disclosure is not limited to this configuration. This disclosure also includes a configuration in which the first action part does not include the cam and the movable plate is moved by a gear train. Further, although the cam 150 and the worm wheel gear 116 are separate members in the first embodiment, this disclosure is not limited to this configuration. This disclosure also includes a configuration in which the cam is integrally provided in the worm wheel gear. In this case, the first rotation axis and the second rotation axis become the same.

Although the first rotation body is the first pulley 211 in the second embodiment, this disclosure is not limited to this configuration. The first rotation body may be a gear. The same also applies to the second rotation body. Further, although the second action part includes the fan-shaped gear 216 fixed to the movable plate 50 in the second embodiment, this disclosure is not limited to this configuration. This disclosure also includes a configuration in which the second action part does not include the gear fixed to the movable plate, and the movable plate is pushed up by the cam.

For example, this disclosure can be used for an image reading apparatus, a multifunction machine, or the like.

What is claimed is:

1. An image reading apparatus, comprising:
a supply tray, which supports a sheet to be supplied and includes a movable plate configured to move from a first position to a second position as the sheet supported by a paper feed tray is decreased, the second position being higher than the first position;
a discharge tray, which is positioned below the supply tray to support the sheet to be discharged;
a conveyance guide, which conveys the sheet from the supply tray to the discharge tray;
a reading sensor, which reads an image on the sheet conveyed on the conveyance guide;
a discharge unit, which includes a discharge opening to discharge the sheet conveyed by the conveyance guide to the discharge tray and is configured to move from a third position to a fourth position as the sheet supported by the paper feed tray is decreased, the fourth position being higher than the third position;
a first drive source, which generates a drive force; and
a second drive source, which generates a drive force, wherein
the movable plate is moved by the drive force from the first drive source, and
the discharge unit is moved by the drive force from the second drive source.

2. The image reading apparatus according to claim 1, wherein
the first drive source is mounted on the supply tray.

3. The image reading apparatus according to claim 2, further comprising:
a housing, which includes the conveyance guide, the reading sensor and the discharge unit, wherein
the supply tray includes a supply tray main body, which supports the sheet together with the movable plate at a position further apart from the conveyance guide than the movable plate,
the supply tray main body is movably supported by the housing between a support position where the supply tray main body can support the sheet and an open position where the supply tray main body is separated from the discharge tray to open the discharge opening, and
the first drive source is mounted on the supply tray main body.

4. The image reading apparatus according to claim 3, further comprising:
a first drive train, which transmits the drive force from the first drive source to the movable plate, wherein
the first drive train includes:
a first gear, which is provided in the supply tray main body and is rotationally driven by the first drive source;
a second gear, which is provided in the housing, engaged with the first gear when the supply tray main body is at the support position and separated from the first gear when the supply tray main body is at the open position;
a worm gear and a worm wheel gear, which are provided in the housing and are rotationally driven by the second gear; and
a first action part, which moves the movable plate between the first position and the second position by rotation of the worm wheel gear.

5. The image reading apparatus according to claim 4, wherein
the first action part includes a cam which rotates around a second rotation axis same as or parallel with a first rotation axis of the worm wheel gear and moves the movable plate between the first position and the second position by abutting on the movable plate.

6. The image reading apparatus according to claim 5, wherein
the cam rotates in one direction around the second rotation axis,
the cam is formed with a first inclined surface for moving the movable plate from the first position to the second position and a second inclined surface for moving the movable plate from the second position to the first position, and
the first inclined surface is inclined more gently than the second inclined surface.

7. The image reading apparatus according to claim 4, wherein
- the supply tray main body is supported by the housing to be rotatable around a rotation axis, and
- a rotation direction of the first gear is the same as a direction in which the supply tray main body rotates from the open position to the support position.

8. The image reading apparatus according to claim 3, further comprising:
- a second drive train which transmits the drive force from the first drive source to the movable plate, wherein
- the supply tray main body is supported by the housing to be rotatable around a rotation axis, and
- the second drive train includes:
- a first rotation body, which is supported to rotatable around the rotation axis independently from the supply tray main body and is rotationally driven by the first drive source;
- a second rotation body, which is provided in the housing and is rotationally driven by the first rotation body; and
- a second action part, which moves the movable plate between the first position and the second position by rotation of the second rotation body.

\* \* \* \* \*